(12) United States Patent
Segawa

(10) Patent No.: US 9,885,948 B2
(45) Date of Patent: Feb. 6, 2018

(54) TRANSMISSION-TYPE SCREEN AND IMAGE DISPLAY DEVICE USING THE TRANSMISSION-TYPE SCREEN

(71) Applicant: JVC KENWOOD Corporation, Yokohama-shi, Kanagawa (JP)

(72) Inventor: Masaru Segawa, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 15/161,686

(22) Filed: May 23, 2016

(65) Prior Publication Data
US 2016/0266283 A1 Sep. 15, 2016

Related U.S. Application Data

(63) Continuation of application No. PCT/JP2014/074555, filed on Sep. 17, 2014.

(30) Foreign Application Priority Data

Jan. 6, 2014 (JP) .................................. 2014-000236
Feb. 25, 2014 (JP) .................................. 2014-034235

(51) Int. Cl.
| | |
|---|---|
| *G03B 21/60* | (2014.01) |
| *G03B 21/625* | (2014.01) |
| *G03B 21/62* | (2014.01) |
| *H04N 9/31* | (2006.01) |
| *G02B 3/00* | (2006.01) |

(Continued)

(52) U.S. Cl.
CPC ......... *G03B 21/625* (2013.01); *G02B 3/0006* (2013.01); *G02B 3/0062* (2013.01); *G02B 5/02* (2013.01); *G02B 27/0101* (2013.01); *G03B 21/006* (2013.01); *G03B 21/16* (2013.01); *G03B 21/62* (2013.01); *H04N 9/315* (2013.01);

(Continued)

(58) Field of Classification Search
CPC ........................ G02B 27/0101; G02B 3/0006; G02B 3/0062; G02B 5/02; G02B 2027/0118; G03B 21/006; G03B 21/16; G03B 21/62; G03B 21/625; G03B 21/28; H04N 9/315; H04N 9/3152

See application file for complete search history.

(56) References Cited

U.S. PATENT DOCUMENTS

2012/0218641 A1* 8/2012 Kikuchi ............... G02B 3/0056
359/619

FOREIGN PATENT DOCUMENTS

| JP | S57-081254 A | 5/1982 |
|---|---|---|
| JP | S62-29938 U | 2/1987 |

(Continued)

*Primary Examiner* — Sultan Chowdhury
*Assistant Examiner* — Magda Cruz
(74) *Attorney, Agent, or Firm* — Brundidge & Stanger, P.C.

(57) ABSTRACT

A transmission-type screen includes: a first lens array surface on which a plurality of first microlenses are arrayed; and a second lens array surface that is provided at a distance in a direction perpendicular to the first lens array surface and on which a plurality of second microlenses whose shape is different from the shape of the first microlenses are arrayed. A level line near a vertex is circular or elliptical in the first microlenses, and a level line near a vertex is elliptical with ellipticity different from the ellipticity of the level line of the first microlenses in the second microlenses.

5 Claims, 17 Drawing Sheets

(51) Int. Cl.
*G02B 5/02* (2006.01)
*G02B 27/01* (2006.01)
*G03B 21/00* (2006.01)
*G03B 21/16* (2006.01)
*G03B 21/28* (2006.01)

(52) U.S. Cl.
CPC ... *H04N 9/3152* (2013.01); *G02B 2027/0118* (2013.01); *G03B 21/28* (2013.01)

(56) References Cited

FOREIGN PATENT DOCUMENTS

| | | |
|---|---|---|
| JP | H05-085224 A | 4/1993 |
| JP | 2006-157748 A | 6/2006 |
| JP | 2010-145746 A | 7/2010 |
| JP | 2012-226304 A | 11/2012 |
| JP | 2013-180713 A | 9/2013 |
| JP | 2015-011212 A | 1/2015 |
| JP | 2015-080988 A | 4/2015 |
| WO | 2012-117495 A1 | 9/2012 |

\* cited by examiner

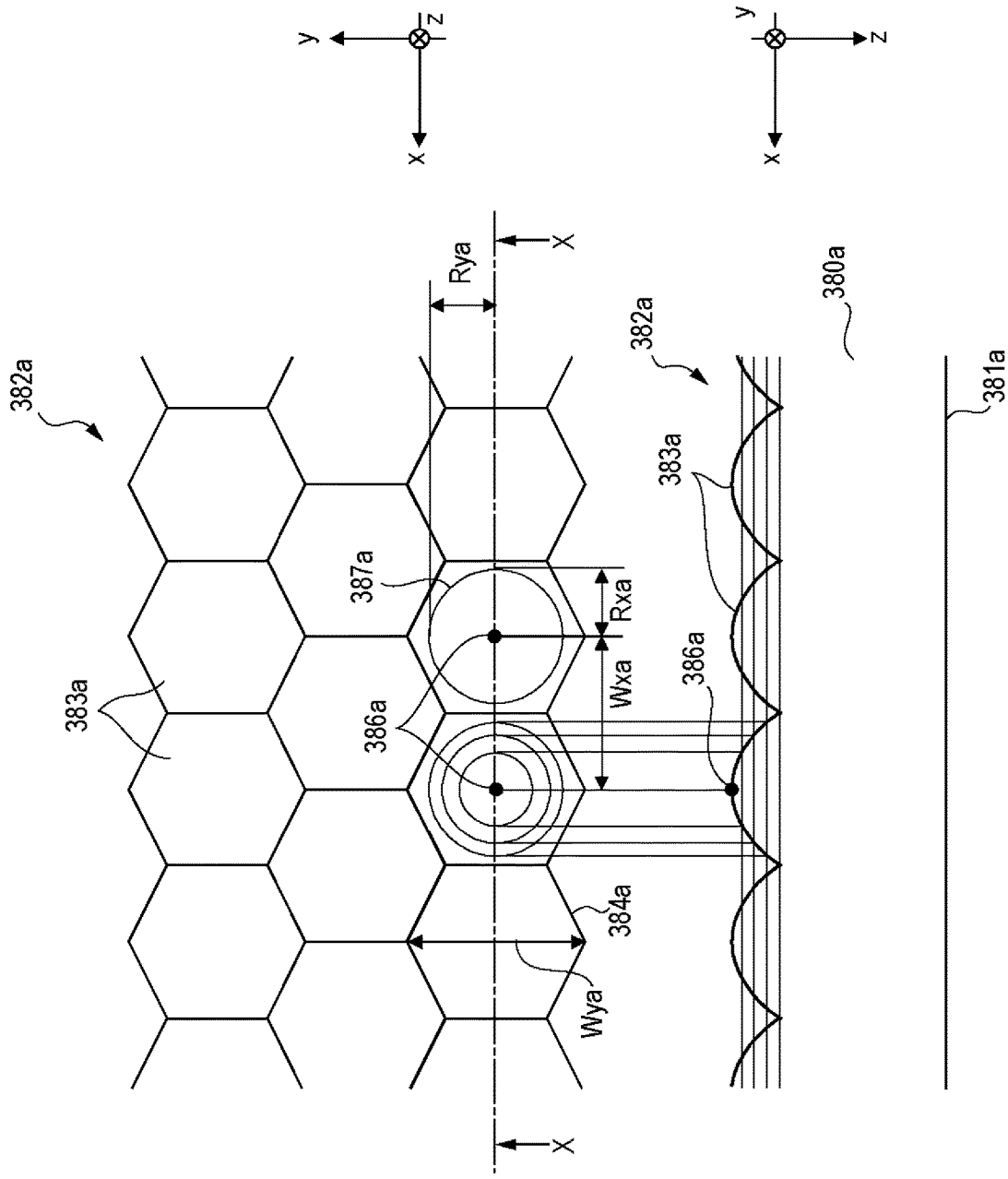

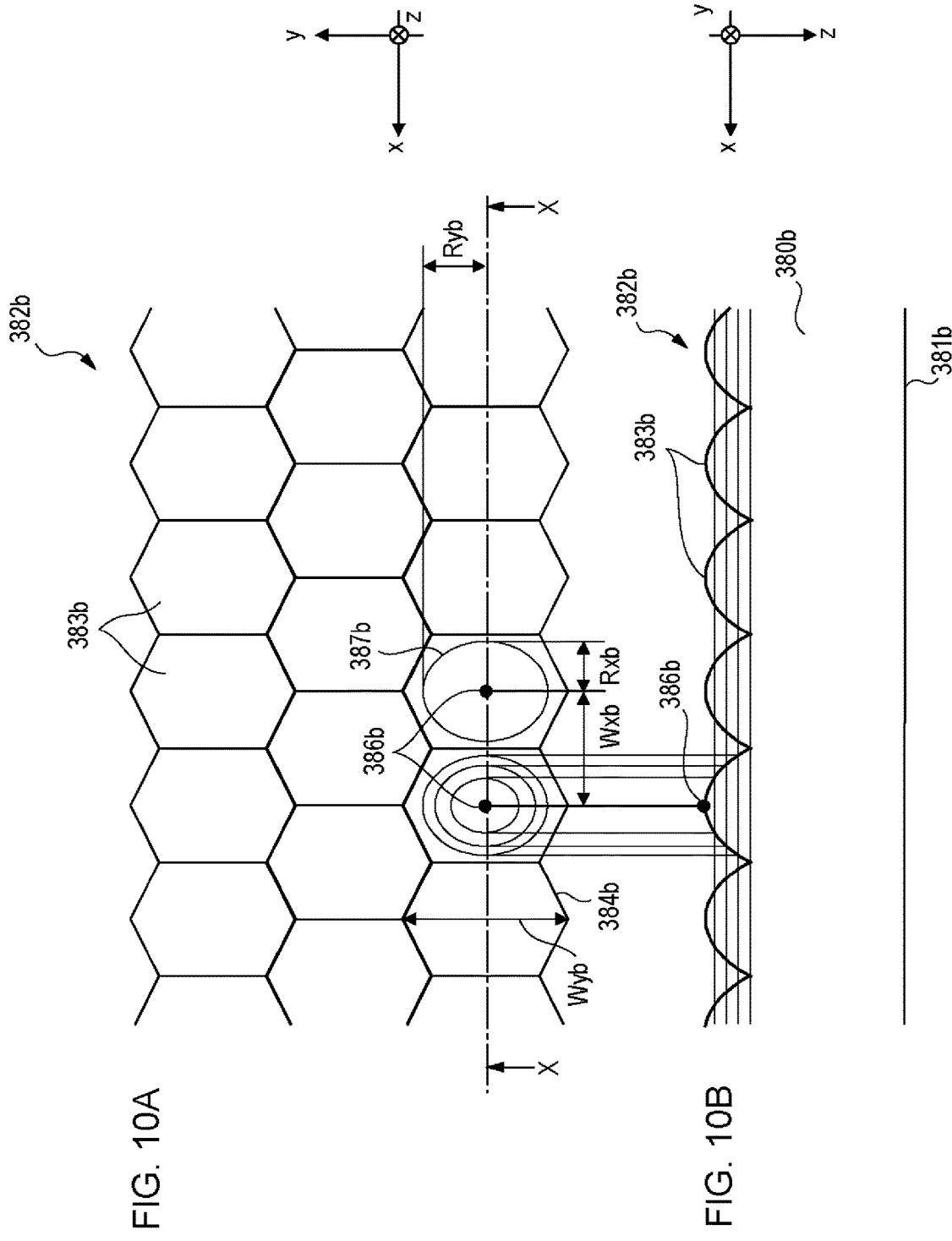

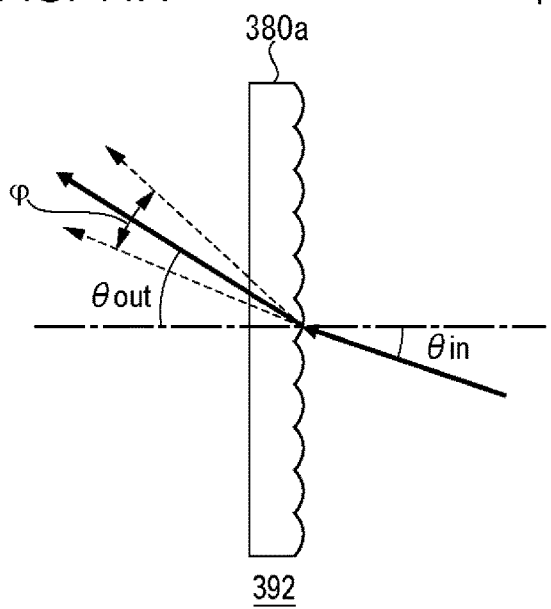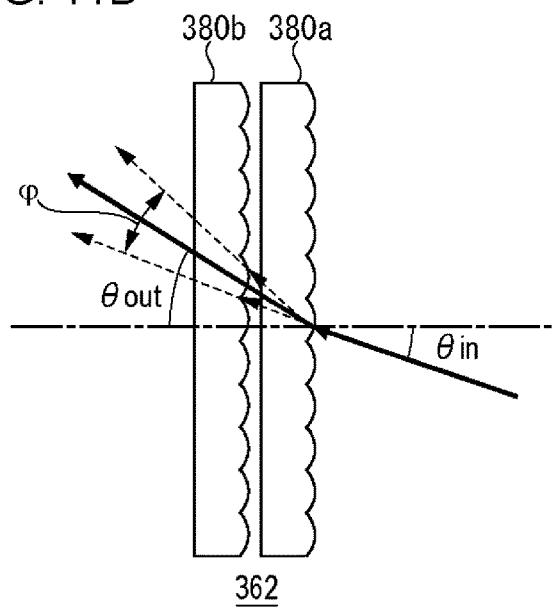

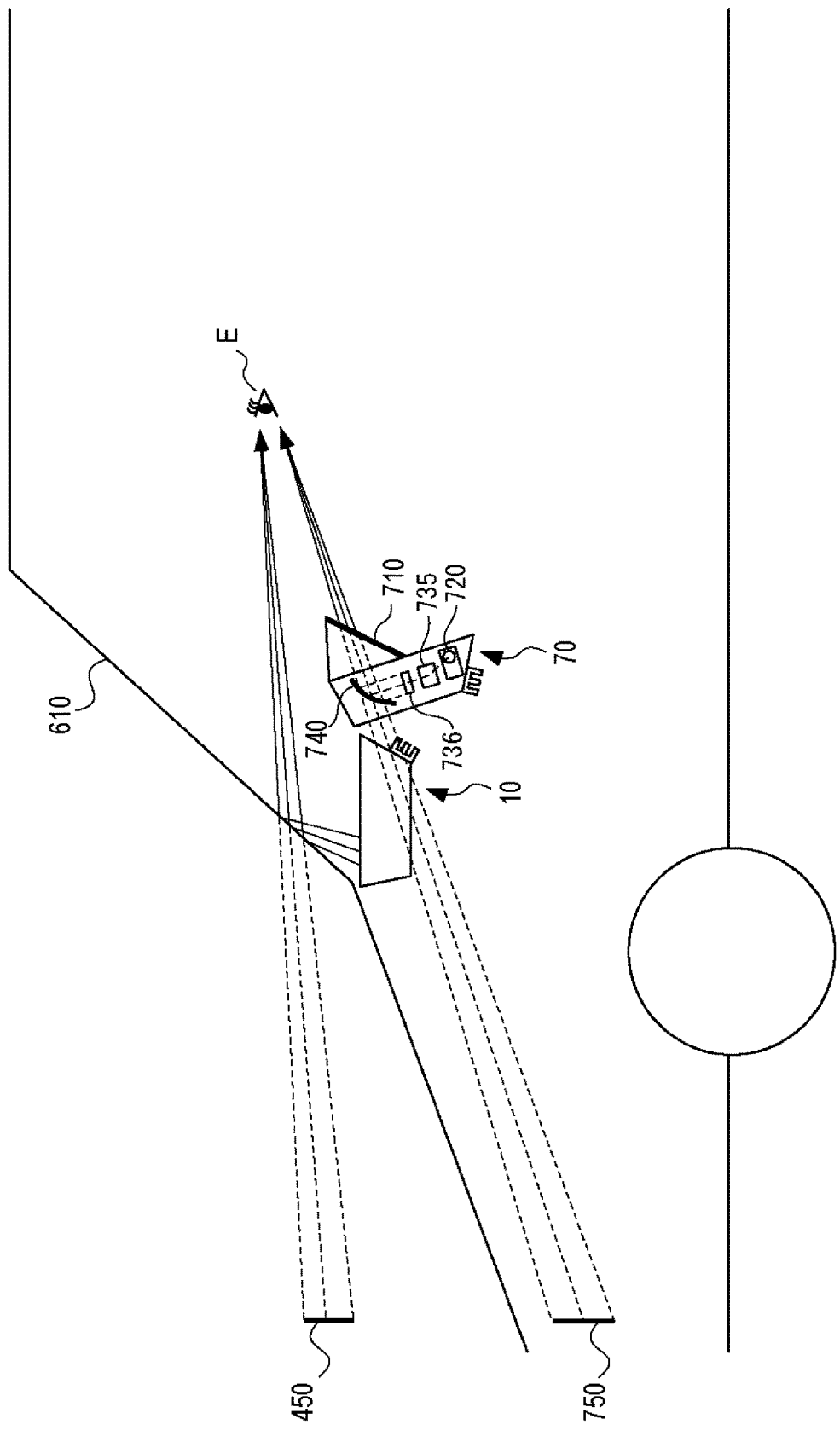

TRANSMISSION-TYPE SCREEN AND IMAGE DISPLAY DEVICE USING THE TRANSMISSION-TYPE SCREEN

CROSS REFERENCE TO RELATED APPLICATION

This application is based upon and claims the benefit of priority from the prior Japanese Patent Application No. 2014-000236, filed on Jan. 6, 2014, and Japanese Patent Application No. 2014-034235, filed on Feb. 25, 2014, the entire contents of which are incorporated herein by reference.

BACKGROUND

1. Field of the Invention

The present invention relates to transmission-type screens and image display devices using the transmission-type screens.

2. Description of the Related Art

Display devices for vehicles called head-up displays are known. Head-up displays are display devices that display information over a landscape outside a vehicle by allowing light entering from outside the vehicle to pass through and reflecting, on a windshield or the like of the vehicle, an image projected from an optical unit arranged inside the vehicle. Head-up displays have received attention as display devices for vehicles in recent years since head-up displays allow a driver who is visually recognizing a view outside a vehicle to recognize information of an image projected from an optical unit almost without changing the line of sight or a focus.

Image display light projected from the optical unit once forms an image on a transmission-type screen, and the image formed on the screen is presented to the user. As such a transmission-type screen, a configuration is disclosed where two microlens array units are arranged so as to face each other.

SUMMARY

The user recognizes the image via the transmission-type screen. Thus, the transmission-type screen is highly visible, desirably.

In this background, a purpose of the present invention is to provide transmission-type screens with enhanced visibility.

A transmission-type screen according to one embodiment of the present invention includes: a first lens array surface on which a plurality of first microlenses are arrayed; and a second lens array surface that is provided at a distance in a direction perpendicular to the first lens array surface and on which a plurality of second microlenses whose shape is different from the shape of the first microlenses are arrayed. A level line near a vertex is circular or elliptical in the first microlenses, and a level line near a vertex is elliptical with ellipticity different from the ellipticity of the level line of the first microlenses in the second microlenses.

Another embodiment of the present invention relates to an image display device. This device includes: an image projection unit that projects image display light; an intermediate image formation unit that forms a real image that is based on the image display light projected from the image projection unit; and a projection mirror that reflects, toward a virtual image presenting surface, the image display light that has passed through the intermediate image formation unit. The intermediate image formation unit includes: a first lens array surface on which a plurality of first microlenses are arrayed; and a second lens array surface that is provided at a distance in a direction perpendicular to the first lens array surface and on which a plurality of second microlenses whose shape is different from the shape of the first microlenses are arrayed. A level line near a vertex is circular or elliptical in the first microlenses, and a level line near a vertex is elliptical with ellipticity different from the ellipticity of the level line of the first microlenses in the second microlenses.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 9A is a top view illustrating a structure of a first lens array surface, and FIG. 9B is a cross-sectional view illustrating the structure of the first lens array surface;

FIG. 10A is a top view illustrating a structure of a second lens array surface, and FIG. 10B is a cross-sectional view illustrating the structure of the second lens array surface;

FIG. 11A is a diagram schematically illustrating a diffusion screen according to a comparative example, and FIG. 11B is a diagram schematically illustrating a diffusion screen according to the embodiment;

FIG. 15 is a diagram schematically illustrating a form of installation of a head-up display and an instrument panel according to another embodiment of the present invention;

DETAILED DESCRIPTION

Figure 1:
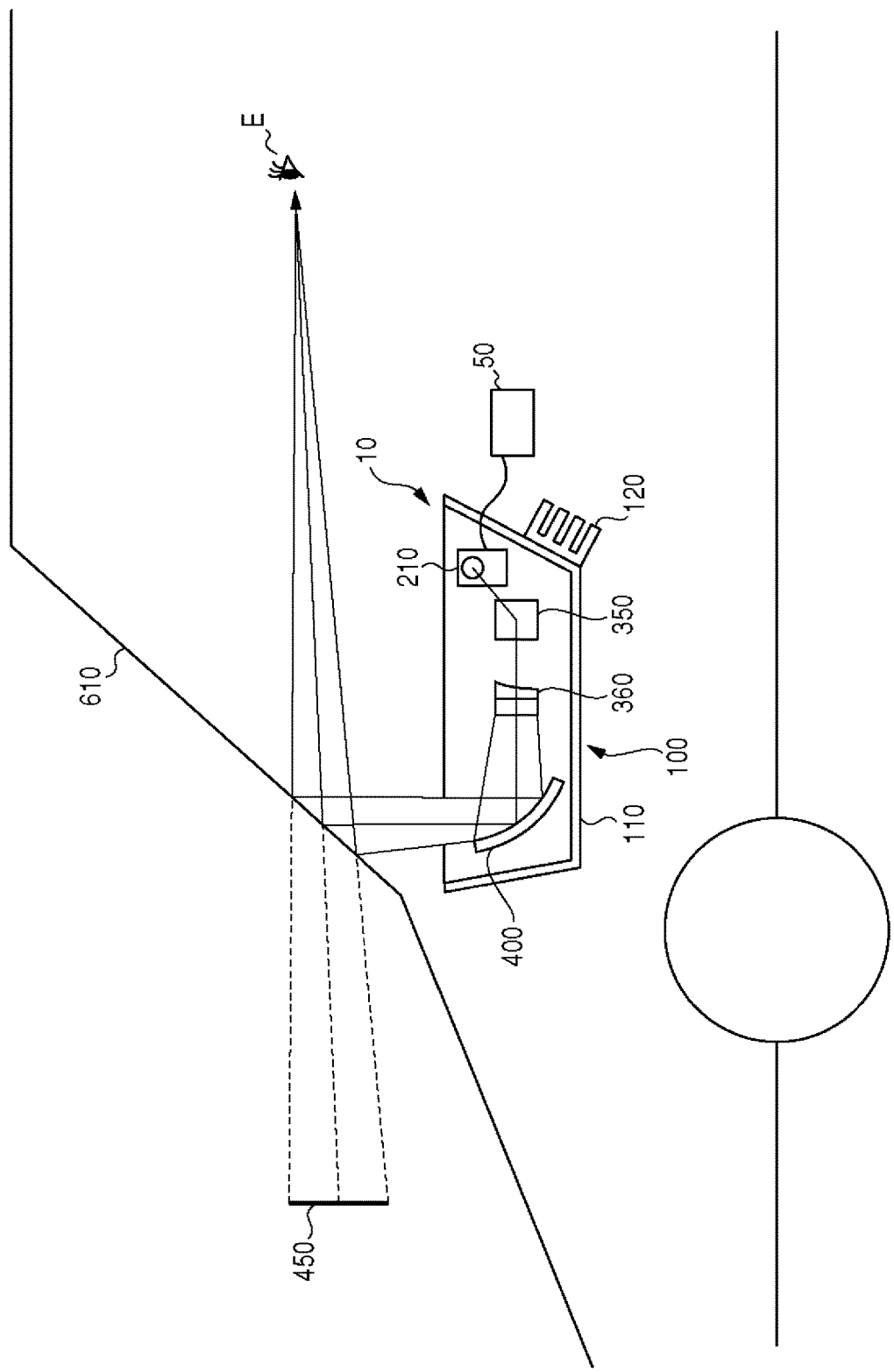
FIG. 1 is a diagram schematically illustrating a form of installation of a head-up display according to an embodiment of the present invention.

The invention will now be described by reference to the preferred embodiments. This does not intend to limit the scope of the present invention, but to exemplify the invention.

Described below is an explanation of the embodiments of the present invention with reference to figures. Specific numerical values and the like shown in the embodiments are shown merely for illustrative purposes to facilitate understanding of the invention and do not intend to limit the scope of the present invention, unless otherwise noted. In the subject specification and figures, elements having substantially the same functions and structures shall be denoted by the same reference numerals, and duplicative explanations will be omitted appropriately. Also, the illustration of elements that are not directly related to the present invention is omitted.

First Embodiment

An explanation will be given using a head-up display 10, which is installed and used inside a dashboard of a vehicle, as an example of an image display device according to an embodiment. FIG. 1 is a diagram schematically illustrating a form of installation of the head-up display 10 according to the embodiment of the present invention. The head-up display 10 includes an optical unit 100 and a control device 50. FIG. 1 is a diagram illustrating a case where the optical unit 100 is arranged and used inside a left-side dashboard based on a travelling direction (leftward direction in FIG. 1) of a vehicle. The following embodiment shows an example where the head-up display 10 is arranged for a driver of a left-hand drive vehicle. For a right-hand drive vehicle, the internal configuration of the optical unit 100 may be horizontally flipped based on a travelling direction of the vehicle. With reference to FIG. 1, an explanation will be given of the outline of the head-up display 10 in the following.

A control device 50 is provided with a central processing unit (CPU) (not shown) and generates an image signal used for display on the optical unit 100. The control device 50 is also provided with an external input interface (not shown). An image signal output from an external device (not shown) such as a navigation device, a media reproduction device, or the like is input to the control device 50, and the control device 50 is also capable of outputting the image signal to the optical unit 100 after performing a predetermined process on the signal that has been input.

The optical unit 100 generates image display light that is displayed as a virtual image 450 on a windshield 610 based on the image signal generated by the control device 50. Therefore, the optical unit 100 is provided with an image projection unit 210, an intermediate mirror 350, an intermediate image formation unit 360, and a projection mirror 400 inside a housing 110.

The image projection unit 210 houses a light source, an image display element, various optical lenses, and the like. The image projection unit 210 generates image display light based on the image signal output from the control device 50 and projects the image display light. In the present embodiment, a case where a liquid crystal on silicon (LCOS), which is a reflection type liquid crystal display panel, is used as an image display element is illustrated for example.

The image display light projected by the image projection unit 210 is reflected by the intermediate mirror 350. The image display light reflected by the intermediate mirror 350 forms an image in the intermediate image formation unit 360. The image display light related to a real image formed in the intermediate image formation unit 360 is transmitted through the intermediate image formation unit 360 and projected on the projection mirror 400.

The projection mirror 400 is a concave mirror, and the image display light transmitted through the intermediate image formation unit 360 is enlarged and projected on the windshield 610 by the projection mirror 400. The optical path of the image display light projected on the windshield 610 is changed to be directed toward the user by the windshield 610. A user E, who is the driver, recognizes the image display light, which is reflected by the windshield 610, as a virtual image 450 in front of the windshield 610 in the direction of the line of sight.

Figure 2:
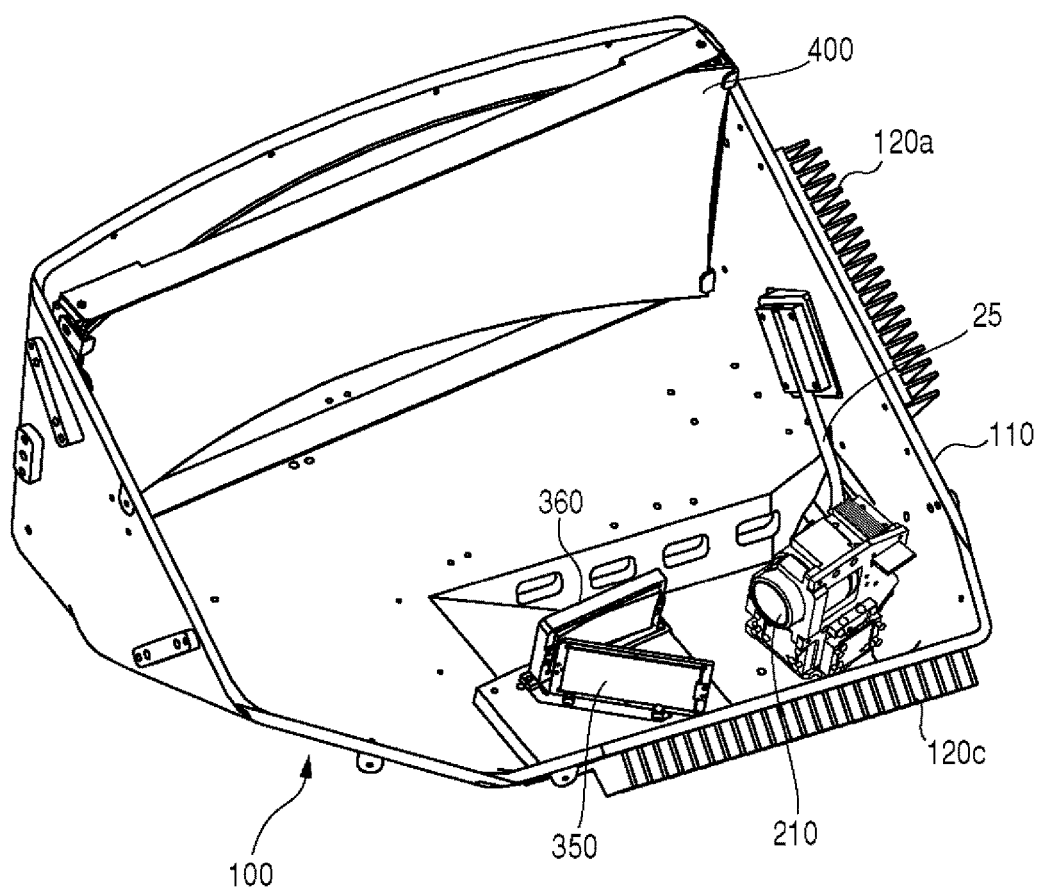
FIG. 2 is a diagram illustrating the internal configuration of an optical unit.

FIG. 2 is a diagram illustrating the internal configuration of the optical unit 100 according to the embodiment of the present invention. With reference to FIG. 2, an explanation will be given of the internal configuration of the optical unit 100 in the following.

As described above, the optical unit 100 is provided with an image projection unit 210, an intermediate mirror 350, an intermediate image formation unit 360, and a projection mirror 400 on the inside of a housing 110. The image projection unit 210 is provided with three different types of light sources each generating red light, green light, or blue light. The details will follow. The light sources can be realized using light emitting diodes (LED) or semiconductor laser light sources. In the present embodiment, a case where LEDs are used as the light sources will be explained.

The light sources generate heat during use. Therefore, the optical unit 100 is provided with a heat sink for cooling the light sources. There are three types of light sources. Thus, in order to cool these light sources, the optical unit 100 is provided with a heat sink 120a that is connected to a red light source, a heat sink 120b (not shown) that is connected to a green light source, and a heat sink 120c that is connected to a blue light source on the outside of the housing 110.

The housing 110 is a die case made of aluminum. The heat sink 120b and the heat sink 120c for cooling the blue light source and the green light source, respectively, are formed integrally with the housing 110. On the other hand, the heat sink 120a for cooling the red light source is installed at a place that is spatially apart from the heat sink 120b and the heat sink 120c and is externally attached separately from the housing 110. Therefore, heat generated by the red light source is transferred to the heat sink 120a via a heat pipe 25.

Figure 3:
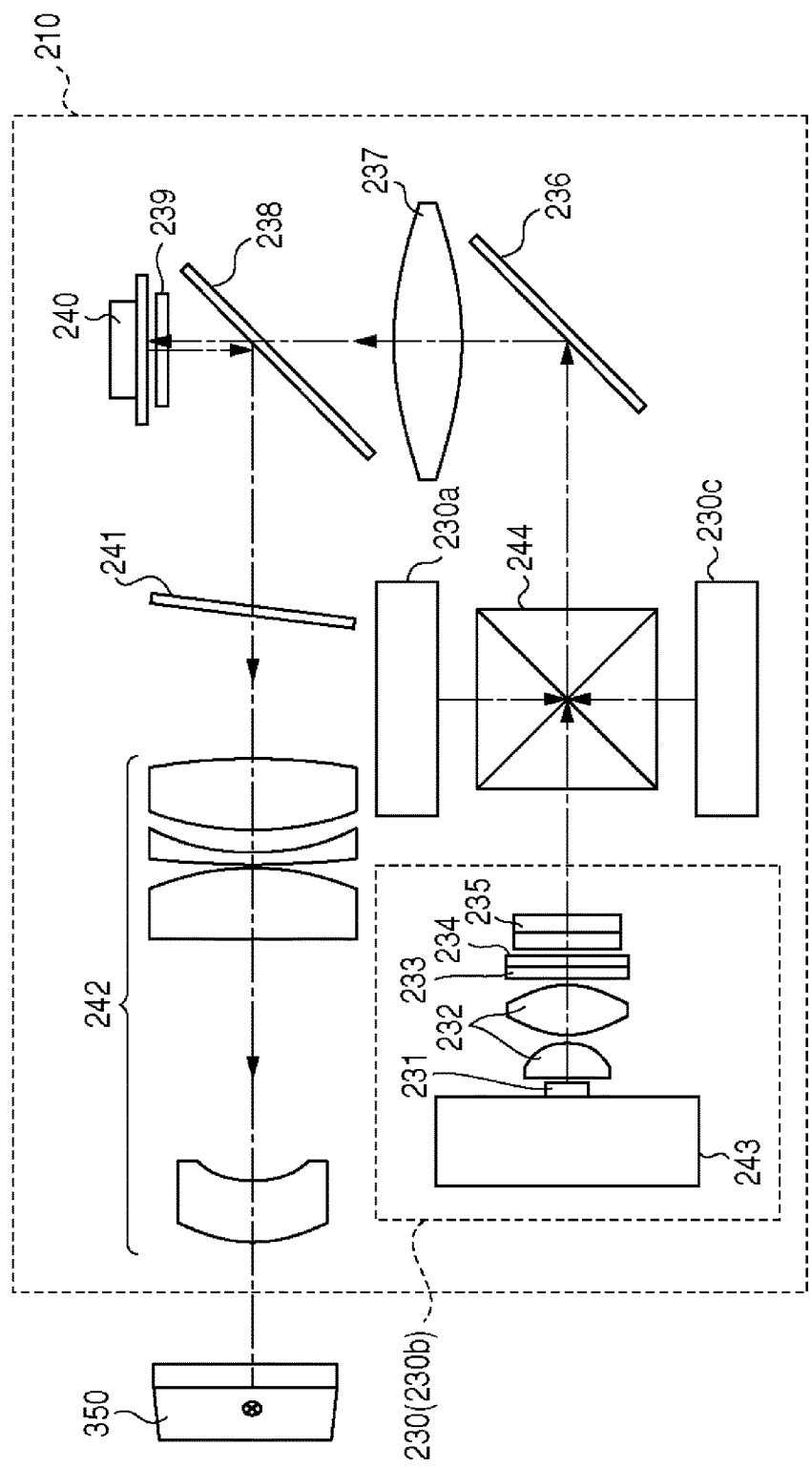
FIG. 3 is a diagram schematically illustrating the internal configuration of an image projection unit.
Figure 4:
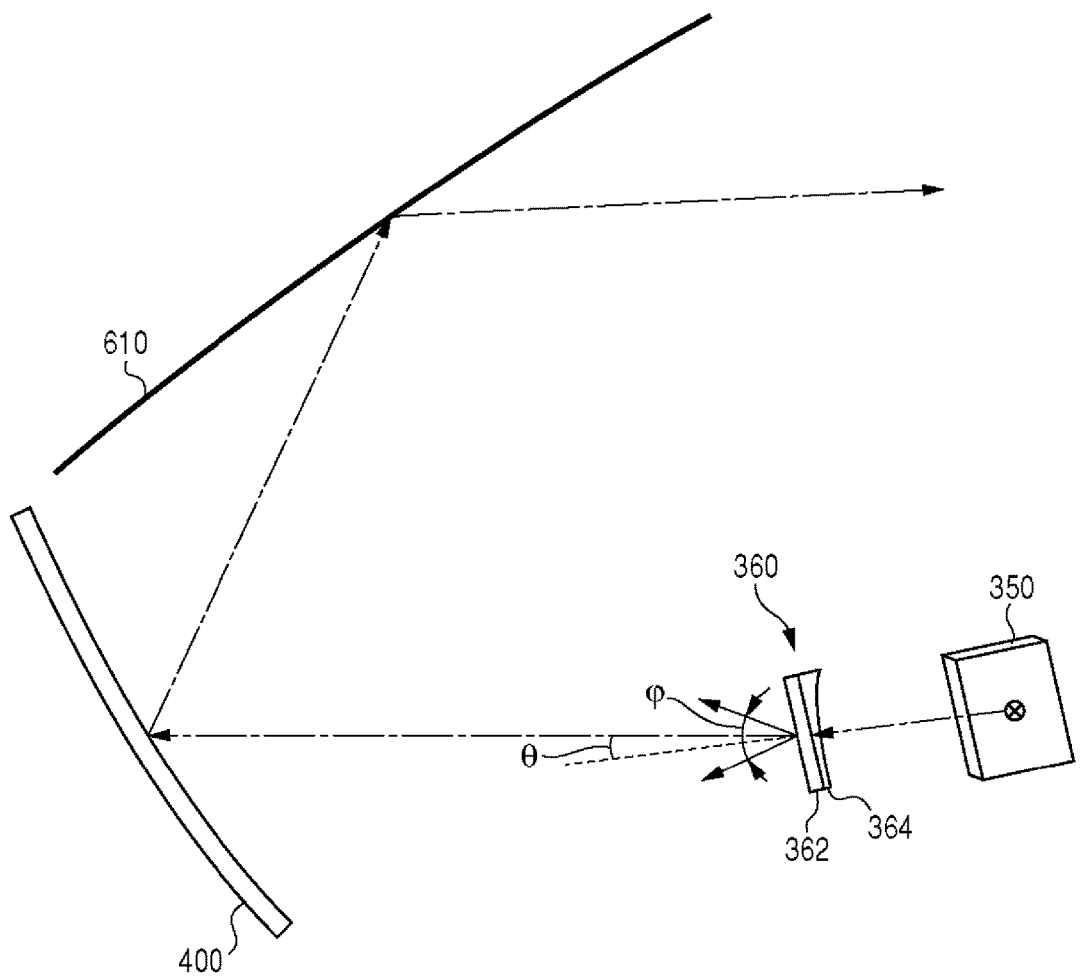
FIG. 4 is a diagram illustrating an optical path of image display light that is projected on a windshield.

An explanation will now be given regarding the optical system of the head-up display 10 with reference to FIG. 3 and FIG. 4. FIG. 3 is a diagram schematically illustrating the internal configuration of the image projection unit 210 along with an optical path of the image display light. FIG. 4 is a diagram illustrating the optical path of the image display light that is projected on the windshield 610 via the intermediate mirror 350, the intermediate image formation unit 360, and the projection mirror 400.

With reference to FIG. 3, an explanation will be given of the internal configuration of the image projection unit 210. The image projection unit 210 is provided with illumination unit 230a, 230b, and 230c (hereinafter, also referred to as illumination units 230 generically), a dichroic cross prism 244, a reflection mirror 236, a field lens 237, a polarization beam splitter 238, a retardation plate 239, an analyzer 241, and a projection lens group 242. In FIG. 3, the descriptions regarding the internal configuration of the first illumination unit 230a and the internal configuration of the third illumination unit 230c are omitted, and only the internal configuration of the second illumination unit 230b is shown. However, the illumination units 230 have the same configuration.

The illumination units 230 are provided with a light source 231, a collimate lens 232, an ultraviolet-infrared ray (UV-IR) cut filter 233, a polarizer 234, and a fly-eye lens 235. The light source 231 consists of a light-emitting diode that emits light of any one of a red color, a green color, and a blue color. The first illumination unit 230a has a light-emitting diode that emits red light as a light source. The second illumination unit 230b has a light-emitting diode that emits green light as the light source 231. The third illumination unit 230c has a light-emitting diode that emits blue light as a light source.

The light source 231 is attached to a light-source attachment portion 243. The light-source attachment portion 243 is combined thermally with a heat sink (not shown) and releases heat that is generated along with the emission of light by the light source 231. The light emitted by the light source 231 is changed to parallel light by the collimate lens 232. The UV-IR cut filter 233 absorbs and removes ultraviolet light and infrared light from the parallel light passed through the collimate lens 232. The polarizer 234 changes light that has passed through the UV-IR cut filter 233 to P-polarized light without disturbance. The fly-eye lens 235 then adjusts the brightness of light that has passed through the polarizer 234 to be uniform.

Light that has passed through respective fly-eye lenses 235 of the illumination units 230 enter the dichroic cross prism 244 from different directions. Red light, green light, and blue light that have entered the dichroic cross prism 244 become white light in which the three colors are combined and travel to the reflection mirror 236. The reflection mirror 236 changes the optical path of white light that has been synthesized by the dichroic cross prism 244 by 90 degrees. The light reflected by the reflection mirror 236 is collected by the field lens 237. The light collected by the field lens 237 is radiated to the image display element 240 via the polarization beam splitter 238 and the retardation plate 239, which transmit P-polarized light.

The image display element 240 is provided with a color filter of a red color, a green color, or a blue color for each pixel. The light radiated to the image display element 240 is changed to a color that corresponds to each pixel and modulated by a liquid crystal composition provided on the image display element 240. The light then becomes S-polarized image display light and emitted toward the polarization beam splitter 238. The emitted S-polarized light is reflected by the polarization beam splitter 238 and enters the projection lens group 242 after changing the optical path and passing through the analyzer 241. The image display light transmitted through the projection lens group 242 exits the image projection unit 210 and enters the intermediate mirror 350.

With reference to FIG. 4, an explanation will be given regarding the optical path of the image display light that is projected on the windshield 610 via the intermediate image formation unit 360 and the projection mirror 400 from the intermediate mirror 350. The optical path of the image display light emitted from the projection lens group 242 of the image projection unit 210 is changed to an optical path that is traveling to the projection mirror 400 by the intermediate mirror 350. In the meantime, a real image based on the image display light reflected by the intermediate mirror 350 is formed in the intermediate image formation unit 360.

The intermediate image formation unit 360 has a diffusion screen 362 and a concave lens 364. The diffusion screen 362 controls a light distribution angle $\psi$ of the image display light traveling to the projection mirror 400 as well as forming a real image based on the image display light passing through the intermediate image formation unit 360. The concave lens 364 controls the direction of a principal ray of the image display light traveling to the projection mirror 400 and adjusts an angle $\theta$ formed by image display light before passing through the intermediate image formation unit 360 and image display light after passing through the intermediate image formation unit 360.

The image display light transmitted through the intermediate image formation unit 360 is reflected by the projection mirror 400 and projected on the windshield 610. The optical path of the image display light projected on the windshield 610 is changed to be directed toward the user by the windshield 610. Thereby, as described above, the user is able to visually recognize a virtual image based on the image display light in the forward direction via the windshield 610. Therefore, the windshield 610 functions as a virtual image presenting surface.

A configuration such as the one described above allows for the user to visually recognize a virtual image, which is based on an image signal output from the control device 50, over the real landscape via the windshield 610.

Figure 5:
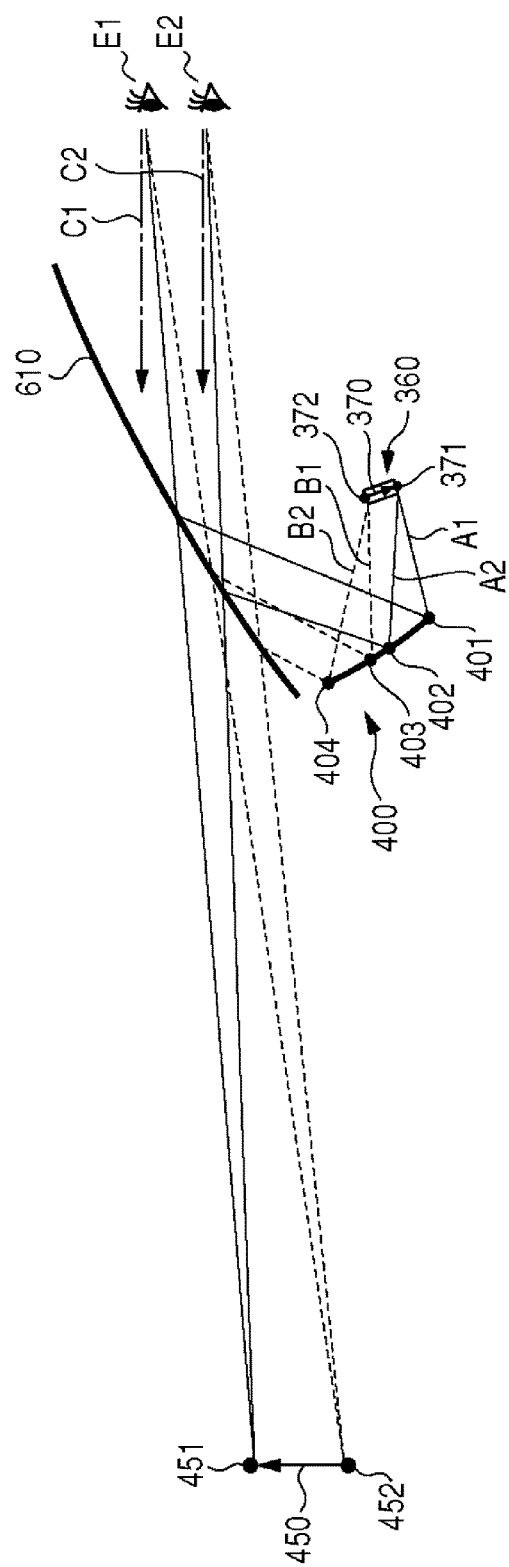
FIG. 5 is a diagram illustrating optical paths of image display light when a virtual image is presented for viewpoints of different height levels.
Figure 6:
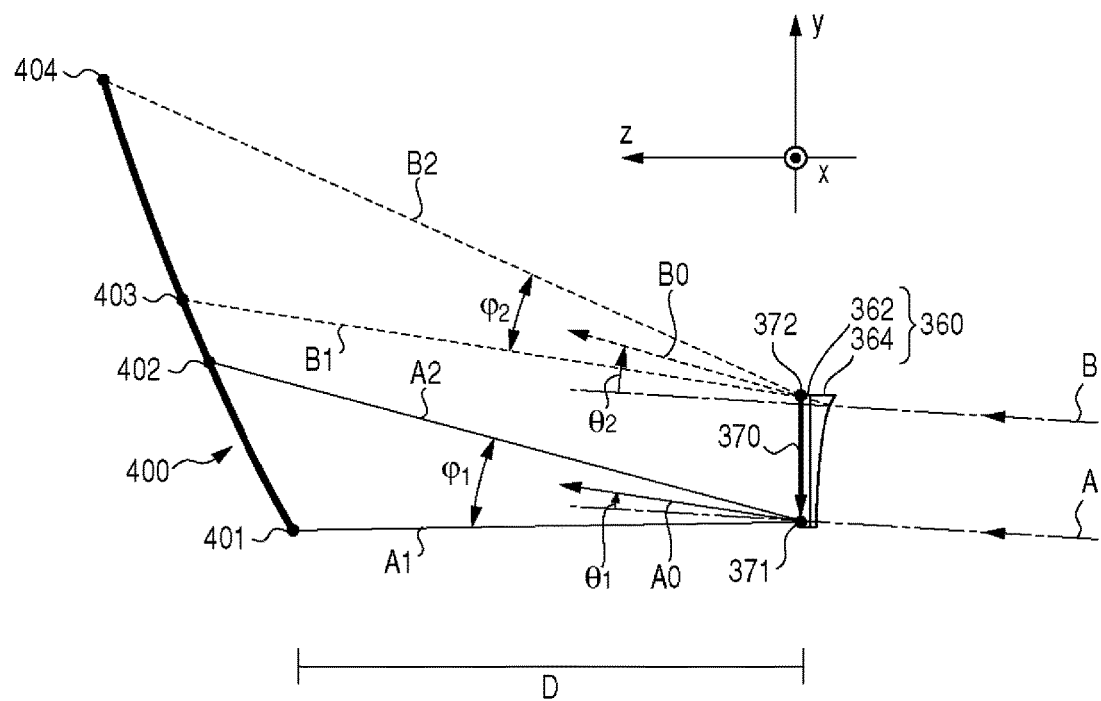
FIG. 6 is a diagram illustrating image display light that is distributed by an intermediate image formation unit.

With reference to FIG. 5 and FIG. 6, functions of the intermediate image formation unit 360 according to the present embodiment will be described in detail. FIG. 5 is a diagram illustrating optical paths of image display light when a virtual image 450 is presented for viewpoints E1 and E2 of different height levels. FIG. 6 is a diagram illustrating image display light that is distributed by the intermediate image formation unit 360 and shows, in an enlarged view, optical paths between the intermediate image formation unit 360 and the projection mirror 400 that are shown in FIG. 5.

As shown in FIG. 5, the viewpoints E1 and E2 of the user, who is the driver, change in the vertical direction depending on the height or the seating position of the driver. Even when a viewpoint of the user changes, the entirety of the virtual image 450 from an upper end portion 451 to a lower end portion 452 can be visually recognized preferably. Further, instead of presenting the virtual image 450 right in front of a line-of-sight direction C1 or C2 in which the user looks in the forward direction of the vehicle, presenting the virtual image 450 at a position that is shifted in the vertical direction allows the user to refer to the virtual image 450 by slightly shifting the direction of the line of sight when necessary, thus ensuring the user-friendliness.

In the present embodiment, by combining the diffusion screen 362 and the concave lens 364 as the intermediate image formation unit 360, the direction of a principal ray and the light distribution angle of the image display light that has passed through the intermediate image formation unit 360 are controlled, and the visibility of the virtual image 450 is increased. In particular, by providing the concave lens 364 eccentrically in the vertical direction, the presentation position of the virtual image 450 can be shifted in the vertical direction, and the virtual image 450 can be presented at an easily viewable position. In the present embodiment, a configuration is shown for a case where the virtual image 450 is presented downward with respect to the line-of-sight directions C1 and C2. However, by changing the state of eccentricity of the concave lens 364, the virtual image 450 may be presented at a different position.

First, differences in a path of image display light according to differences between the viewpoint E1 and the viewpoint E2 are described in detail with reference to FIG. 5. The first viewpoint E1 is an upper limit position that allows the entirety of the virtual image 450 to be visually recognized, and the second viewpoint E2 is a lower limit position that allows the entirety of the virtual image 450 to be visually recognized. Therefore, the user is able to visually recognize the entirety of the virtual image 450 as long as the user's viewpoint is in a range between the first viewpoint E1 and the second viewpoint E2.

In FIG. 5, light A1 and light A2 that are shown by solid lines represent light rays for presenting the user the upper end portion 451 of the virtual image 450, and light that is emitted from an upper end portion 371 of a real image 370 formed in the intermediate image formation unit 360 is reflected on the projection mirror 400 and the windshield 610 and reaches the user's viewpoints E1 and E2. The light A1 that is traveling to the first viewpoint E1 is reflected at a first reflection position 401 of the projection mirror 400, and the light A2 that is traveling to the second viewpoint E2 is reflected at a second reflection position 402 of the projection mirror 400. In an optical system shown in the present embodiment, a configuration is employed where image display light is reflected on the projection mirror 400 and the windshield 610. Thus, a real image that is vertically flipped is formed in the intermediate image formation unit 360.

On the other hand, light B1 and light B2 that are shown by broken lines represent light rays for presenting the user the lower end portion 452 of the virtual image 450, and light that is emitted from a lower end portion 372 of the real image 370 formed in the intermediate image formation unit 360 is reflected on the projection mirror 400 and the windshield 610 and reaches the viewpoints E1 and E2. The light B1 that is traveling to the first viewpoint E1 is reflected at a third reflection position 403 of the projection mirror 400, and the light B2 that is traveling to the second viewpoint E2 is reflected at a fourth reflection position 404 of the projection mirror 400.

Then, image display light that is distributed in the vertical direction by the intermediate image formation unit 360 will be described in detail with reference to FIG. 6. FIG. 6 shows, in an enlarged view, the optical paths between the intermediate image formation unit 360 and the projection mirror 400 that are shown in FIG. 5. Light A that forms an image as the upper end portion 371 of the real image 370 enters the concave lens 364, changes the direction in the upward direction (y direction) by an angle θ1, and becomes transmitted based on a direction that is perpendicular to the diffusion screen 362. Then, the light A forms an image as a real image and becomes diffused on the diffusion screen 362 and travels to the projection mirror 400 as image display light having a light distribution angle ψ1. As a result, the light A that enters the intermediate image formation unit 360 becomes image display light that is distributed between light A1 traveling to the first reflection position 401 and light A2 traveling to the second reflection position 402, centering around a principal ray A0.

Similarly, light B that forms an image as the lower end portion 372 of the real image 370 enters the concave lens 364, changes the direction in the upward direction (y direction) by an angle θ2, and becomes transmitted. Then, the light B forms an image as a real image and becomes diffused on the diffusion screen 362 and travels to the projection mirror 400 as image display light having a light distribution angle ψ2. As a result, the light B that enters the intermediate image formation unit 360 becomes image display light that is distributed between light B1 traveling to the third reflection position 403 and light B2 traveling to the fourth reflection position 404, centering around a principal ray B0.

The concave lens 364 according to the present embodiment is provided eccentrically in the vertical direction (the vertical direction in FIG. 4) based on the z direction. More specifically, the position of an optical axis of the concave lens 364 is located below the center position of the diffusion screen 362. Therefore, the angle θ2 of the principal ray B0 emitted from the lower end portion 372, which is far away from the optical axis of the concave lens 364, is larger than the angle θ1 of the principal ray A0 emitted from the upper end portion 371, which is close to the optical axis of the concave lens 364. The concave lens 364 according to the present embodiment is formed such that the optical axis of the concave lens 364 is not included in a concave surface thereof. Thus, the principal rays A0 and B0 are both emitted in a tilted manner toward the upward direction (y direction).

Figure 7:
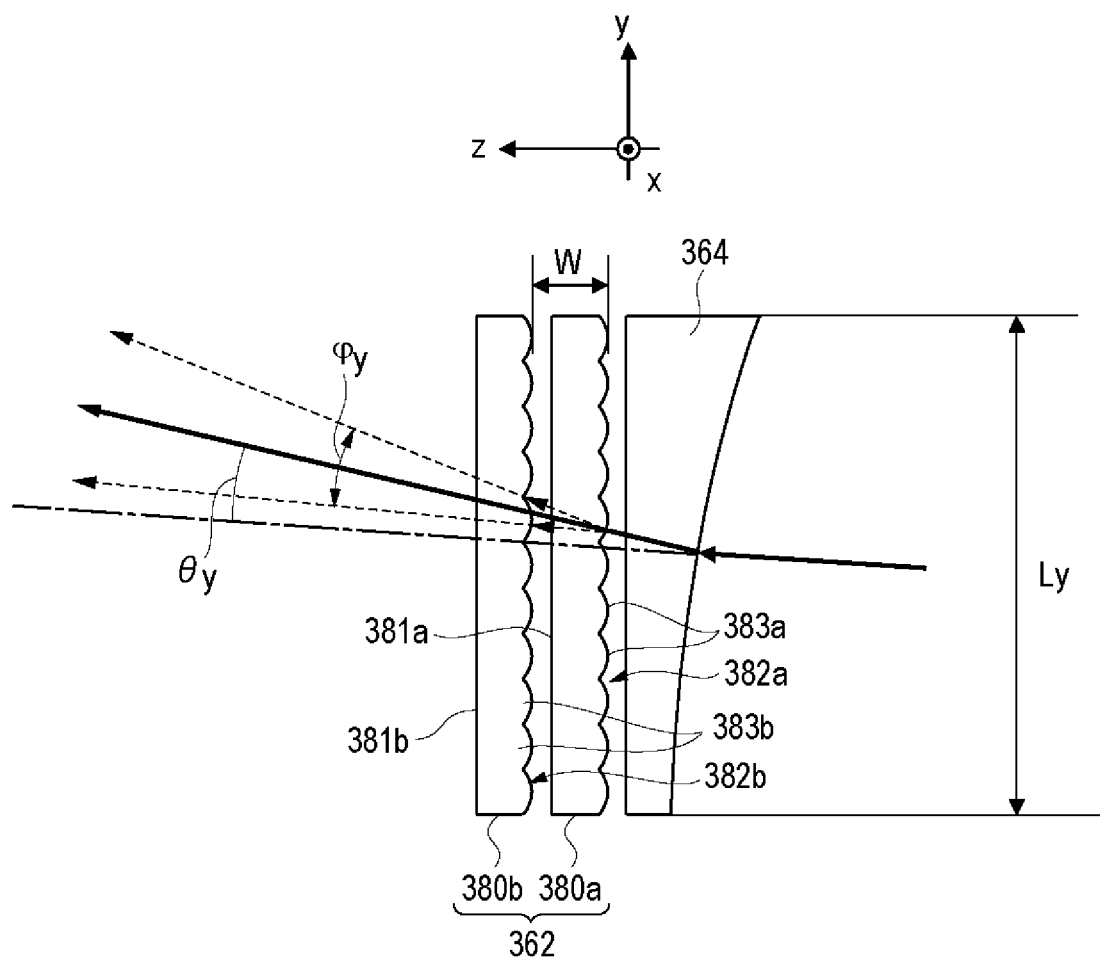
FIG. 7 is a side view schematically illustrating the configuration of a diffusion screen.
Figure 8:
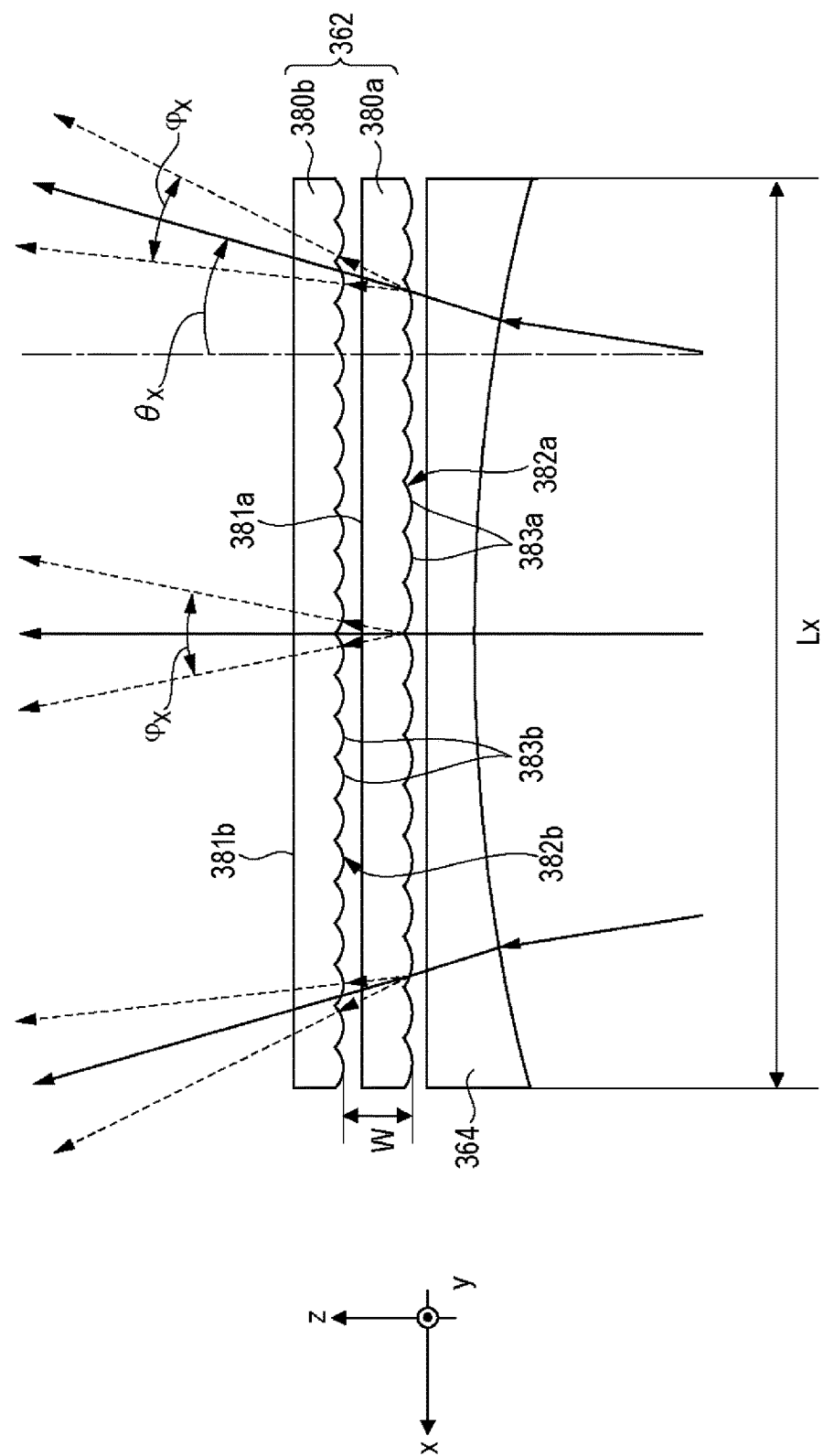
FIG. 8 is a top view schematically illustrating the configuration of the diffusion screen.

Then, with reference to FIG. 7 through FIG. 10, a description will be made in detail regarding the diffusion screen 362 in the present embodiment. FIG. 7 is a side view schematically illustrating the configuration of the diffusion screen 362, and FIG. 8 is a top view illustrating the configuration of the diffusion screen 362. The diffusion screen 362, which is a transmission-type screen, is provided with two light diffusion plates 380a and 380b. The light diffusion plates 380a and 380b are microlens arrays in which a plurality of microlenses are arrayed on one side. In the present embodiment, the two light diffusion plates 380a and 380b whose microlenses that constitute respective lens arrays are different in shape from each other are used in combination. By combining microlens arrays having different characteristics, the light distribution characteristic of light transmitted through the diffusion screen 362 is improved so as to provide image display light with high visibility.

The first light diffusion plate 380a has a first flat surface 381a and a first lens array surface 382a, which faces away from the first flat surface 381a and on which a plurality of first microlenses 383a are arrayed. Similarly, the second light diffusion plate 380b has a second flat surface 381b and a second lens array surface 382b, which f the second flat surface 381b and on which a plurality of second microlenses 383b are arrayed. The first light diffusion plate 380a and the second light diffusion plate 380b desirably do not have birefringence or are formed of a material with low birefringence and are formed of, for example, a resin material such as polycarbonate (PC).

The first light diffusion plate 380a is arranged such that the first lens array surface 382a faces the concave lens 364, and the second light diffusion plate 380b is arranged such that the second lens array surface 382b faces the first flat surface 381a. Thereby, the light A entering the diffusion screen 362 passes through the first lens array surface 382a, the first flat surface 381a, the second lens array surface 382b, and the second flat surface 381b in said order.

The first light diffusion plate 380a and the second light diffusion plate 380b are arranged such that a distance W between the first lens array surface 382a and the second lens array surface 382b has a predetermined value. The distance W may be set to be around 200 μm to 400 μm and preferably in a range of around 250 μm to 300 μm. By setting the distance W between the first lens array surface 382a and the second lens array surface 382b to be in this range, generation of moire caused due to periodical arrays of microlenses can be prevented, and an effect where an image is doubled that is caused due to the use of the two light diffusion plates can be suppressed. Moire in this case means interference patterns and means stripe patterns that are visually generated due to shifting in cycles when a plurality of regularly-repeated patterns are superimposed on one another.

In FIGS. 7 and 8, there is a gap between the first light diffusion plate 380a and the second light diffusion plate 380b for the sake of ease of explanation. However, in the present embodiment, the first light diffusion plate 380a and the second light diffusion plate 380b are layered such that the first flat surface 381a and the second lens array surface 382b come into contact with each other. By adjusting the thickness of the first light diffusion plate 380a, the distance W between the first lens array surface 382a and the second lens array surface 382b can be adjusted at this time. Therefore, in order to maintain a predetermined distance W, the thickness of the first light diffusion plate 380a needs to be around 200 µm to 400 µm.

The first light diffusion plate 380a and the second light diffusion plate 380b are configured such that a width Ly in the vertical direction (y axis direction) shown in FIG. 7 and a width Lx in the lateral direction (x axis direction) shown in FIG. 8 are different in accordance with the image size of image display light that forms an image. More specifically, the width Lx in the lateral direction is set to be longer than the width Ly in the vertical direction so that an image that is long in the lateral direction can be presented. This is because an image that is long in the lateral direction is easier to see due to the characteristics of a viewing angle of a human being.

The first light diffusion plate 380a and the second light diffusion plate 380b are configured such that a light distribution characteristic (light distribution angle ψy) in the vertical direction shown in FIG. 7 and a light distribution characteristic (light distribution angle ψx) in the lateral direction (horizontal direction) shown in FIG. 8 are different. More specifically, the light distribution angle ψx in the horizontal direction is set to be larger than the light distribution angle ψy in the vertical direction so that the range of a line-of-sight position in which the entire image that is presented by the image display light can be visually recognized is set to be large in the horizontal direction. A viewpoint position of the user, who is the driver, moves more greatly in the horizontal direction than in the vertical direction in a state where the user is seated. Thus, the visibility is increased by setting a visually-recognizable range in the horizontal direction to be wide.

In the present embodiment, the characteristics of the microlenses 383a and 383b that constitute the lens array surfaces 382a and 382b, respectively, are selected so that the light distribution angle ψx in the horizontal direction becomes large. In the present embodiment, by setting the shape of the first microlens 383a to be circular and setting the shape of the second microlens 383b to be elliptical, the light distribution angle ψx in the horizontal direction is set to be large. With reference to FIGS. 9 and 10, an explanation will be given in the following regarding the shape of the first microlens 383a and the shape of the second microlens 383b that achieve such characteristics.

FIG. 9A is a top view illustrating a structure of the first lens array surface 382a. FIG. 9B is a cross-sectional view illustrating a structure of the first lens array surface 382a and illustrates a cross-sectional surface along line X-X shown in FIG. 9A. The first lens array surface 382a is formed by arraying, in a hexagonal lattice shape, first microlenses 383a whose contour 384a has a regular hexagon shape. The first lens array surface 382a is formed such that the first microlenses 383a are lined in an x-axis direction. The width Wxa of a first microlens 383a in an x direction needs to be around 10 µm to 30 µm and needs to be, for example, around 20 µm. On the other hand, the width Wya of the first microlens 383a in a y direction needs to be a width that allows the contour 384a to form a regular hexagon shape in accordance with the width Wxa in the x direction and needs to be, for example, around 23 µm.

The first microlens 383a forms a lens by a curved surface that is formed by a spherical surface. As a result, the shape of a level line 387a near a vertex 386a of the first microlens 383a becomes circular or approximately circular. The shape of the level line 387a of the first microlens 383a corresponds to a cross-sectional shape that occurs when the first microlens 383a is cut along an x-y plane, which is perpendicular to a z direction. Since the shape of the level line 387a is circular, a diameter Rxa in the x direction and a diameter Rya in the y direction have the same length. The value of first ellipticity: $e_a = Rya/Rxa$, which is obtained by the ratio of these diameters, is 1 or close to 1.

The shape of the level line 387a of the first microlens 383a does not necessarily need to be a perfect circle and may be a shape that is close to a circle that is a little off from a perfect circle due to the processing accuracy and the like of a manufacturing process for forming the first lens array surface 382a. A circular shape in this case means that the diameter Rxa in the x direction and the diameter Rya in the y direction are almost equal to each other and means that the shape is not considered clearly as an ellipse as a result of the diameter Rxa in the x direction and the diameter Rya in the y direction being different from each other.

FIG. 10A is a top view illustrating a structure of the second lens array surface 382b. FIG. 10B is a cross-sectional view illustrating a structure of the second lens array surface 382b and illustrates a cross-sectional surface along line X-X shown in FIG. 10A. In the same way as in the first lens array surface 382a, the second lens array surface 382b is formed such that the second microlenses 383b are arrayed in a hexagonal lattice shape and lined in the x-axis direction.

On the other hand, the contour 384b of a second microlens 383b has a hexagonal shape, instead of a regular hexagonal shape, that looks like a shape that occurs when a regular hexagon is compressed in the x direction. As a result, the second microlens 383b forms a lens by a curved surface that is formed by an elliptical surface, and the shape of a level line 387b near a vertex 386b becomes an elliptical shape. Since the shape is an elliptical shape compressed in the x direction, a diameter Rxb of the level line 387b in the x direction and a diameter Ryb of the level line 387b in the y direction are different in length, and an axis in the x direction and an axis in the y direction serve as a short axis and a long axis, respectively. The value of second ellipticity: $e_b = Ryb/Rxb$, which is obtained by the ratio of the long axis and the short axis, is greater than 1. In other words, the value of the second ellipticity $e_b$ is different from the value of the first ellipticity $e_a$ in the first microlens 383a.

As in the case of the width Wxa of a first microlens 383a in the x direction, the width Wxb of a second microlens 383b in the x direction may be around 10 µm to 30 µm and desirably a value that is different from the value of the width Wxa of the first microlens 383a in the x direction. For example, when the width Wxa of the first microlens 383a in the x direction is set to be 20 µm, the width Wxb of the second microlens 383b in the x direction may be around 15 µm to 19 µm. On the other hand, the width Wyb of the second microlens 383b in the y direction may be a width that corresponds to the width Wxb in the x direction such that the elliptical shape of the level line 387b has the second ellipticity $e_b$. For example, the width Wyb of the second microlens 383b may be set to be around 21 µm to 30 µm.

The second microlens 383b is an elliptically-shaped lens having a short axis in the x direction and a long axis in the y-axis direction. Thus, the curvature thereof in the x direction is larger than the curvature thereof in the y direction. As a result, light entering the second microlens 383b is diffused greatly in the x direction in which the curvature is high compared to in the y direction in which the curvature is low, and a light distribution angle in the x direction becomes large. Thereby, a light distribution angle $\psi x$ in the horizontal direction can be set to be larger than a light distribution angle $\psi y$ in the vertical direction.

Figure 12:
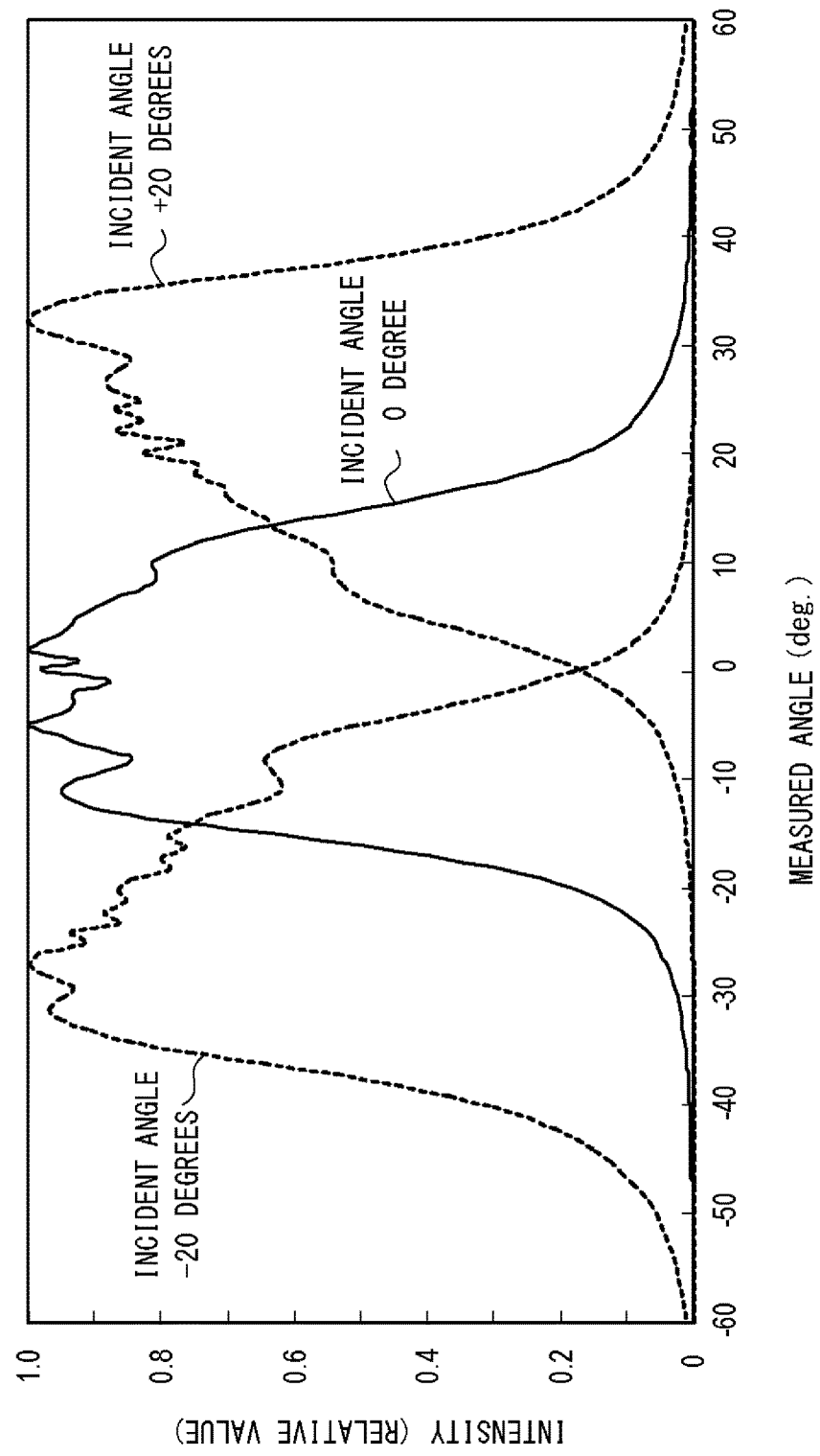
FIG. 12 is a graph illustrating light distribution of light that has passed through the diffusion screen according to the comparative example.
Figure 13:
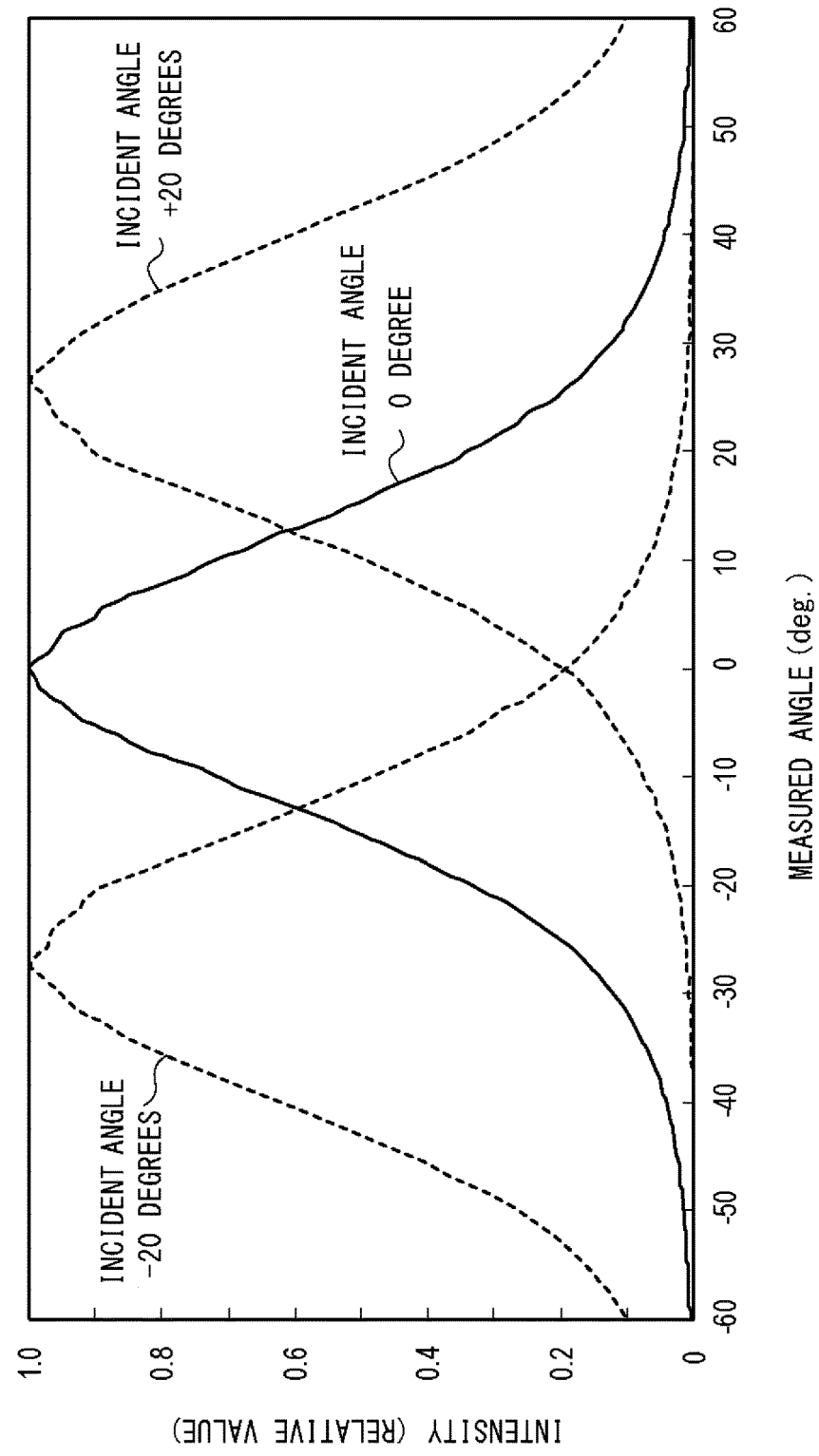
FIG. 13 is a graph illustrating light distribution of light that has passed through the diffusion screen according to the embodiment.

Then, with reference to FIG. 11 through FIG. 13, the light distribution characteristic of a diffusion screen 362 according to the present embodiment will be shown. FIG. 11A is a diagram schematically illustrating a diffusion screen 392 according to a comparative example, and FIG. 11B is a diagram schematically illustrating a diffusion screen 362 according to the embodiment. The diffusion screen 392 according to the comparative example is a transmission-type screen formed of only a first light diffusion plate 380a according to the present embodiment. First, the light distribution characteristic of the diffusion screen 392 according to the comparative example will be shown using FIG. 12, and problems associated with the diffusion screen 392 will be explained. Then, using FIG. 13, the light distribution characteristic of the diffusion screen 362 according to the present embodiment will be shown.

FIG. 12 is a graph illustrating light distribution of light that has passed through the diffusion screen 392 according to the comparative example. This graph shows the light distribution characteristic of transmitted light when an incident angle $\theta$in shown in FIG. 11A is set to be −20 degrees, 0 degree, or 20 degrees. As shown in the figure, light distribution having a jagged shape near a peak can be observed in any of the incident angles $\theta$in. This is considered due to an increase in intensity in a specific direction caused by interference from transmitted light diffracted by a plurality of microlenses since the microlenses are arrayed periodically. When such a diffraction peak is observed, unevenness is caused in the luminance of an image presented by image display light, resulting in a decrease in the visibility.

When the incident angle $\theta$in is −20 degrees or 20 degrees, left-right asymmetric light distribution is observed. While the intensity rises moderately toward a peak position at an angle near the center (0 degree), the intensity rises steeply toward the peak position from an angle away from the center (−60 degrees, 60 degrees). Having such asymmetric light distribution results in the luminance of a virtual image 450 in a partial range being viewed as if the luminance changes rapidly when a line-of-sight position is moved and thus results in a decrease in the visibility. It is necessary to allow the image display light to become incident on the transmission-type screen at an angle in order to increase the visible range of the virtual image 450. Thus, the light distribution of transmitted light is desirably left-right asymmetrical even when the image display light is obliquely incident.

FIG. 13 is a graph illustrating light distribution of light that has passed through a diffusion screen according to the embodiment. This graph shows the light distribution characteristic of transmitted light when an incident angle $\theta$in shown in FIG. 11B is set to be −20 degrees, 0 degree, or 20 degrees. Different from the case in the comparative example, a jagged shape near a peak cannot be observed in any of the incident angles $\theta$in, and light distribution has a smooth shape similar to Gaussian distribution. This is considered due to the lessening of interfering effect caused by the diffraction compared to a case where only one microlens array is used, since two microlens arrays having different microlens shapes are combined. Thereby, unevenness in the luminance of the virtual image 450 can be suppressed, and the visibility can be increased.

Further, the light distribution can be found to have a shape that is similar to a left-right asymmetric shape even when the incident angle $\theta$in is −20 degrees or 20 degrees. This allows the luminance of the virtual image 450 to be uniform even when the line-of-sight position is moved. Thereby, the amount of change in the luminance of an image viewed before the line-of-sight position is moved and viewed after the line-of-sight position is moved can be decreased, and the visibility can be increased.

Further, by combining two microlens arrays, the width of the light distribution angle $\psi$ of transmitted light can be widened compared to a case where only one microlens array is used. The width of the light distribution angle $\psi$ represents, for example, the value of an angle that corresponds to the full width at half maximum of light distribution shown in the graph. By widening the light distribution angle $\psi$ of the transmitted light, the range of the line-of-sight position in which the entire virtual image 450 can be visually recognized can be enlarged. This allows the entire image to be presented even when the line-of-sight position is moved, and the visibility can thus be increased.

Also, in the diffusion screen 362 according to the present embodiment, a distance between the first lens array surface 382a and the second lens array surface 382b is set to be around 200 μm to 400 μm. In general, when two microlens arrays having a periodical array structure are combined, moire is likely to be generated. Even when two diffusion screens without periodicity are combined, images formed on the respective diffusion screens overlap with each other to form a double image and can cause the resolution of the virtual image 450 to be lowered. In the present embodiment, a distance between the lens array surfaces is set to be around 400 μm or less. Thus, a decrease in the resolution caused by the generation of a double image can be suppressed.

Meanwhile, if the distance between the first lens array surface 382a and the second lens array surface 382b is set to be too small, interfering effect of light that is diffracted by the first lens array surface 382a may not be able to be lessened sufficiently by the second lens array surface 382b. In the present embodiment, by setting the distance between the lens array surfaces to be around 200 μm or greater, the generation of a diffraction peak generated when only one microlens array is used can be suppressed. Also, the generation of moire caused by combining periodically-arrayed microlens arrays can be suppressed. In other words, by setting the distance between the two lens array surfaces to be around 200 μm to 400 μm, the generation of unevenness in the luminance and moire can be suppressed while suppressing a decrease in the resolution, and an image with high visibility can be presented.

A description will be given in the following regarding effects that are achieved by the intermediate image formation unit 360 in the present embodiment.

The intermediate image formation unit 360 in the present embodiment has a diffusion screen 362 that controls the light distribution angle of a principal ray such that image display light is realized that has predetermined light distribution angles $\psi 1$ and $\psi 2$ with respect to principal rays A0 and B0, respectively. Therefore, a virtual image with a certain level of brightness can be presented even when the line-of-sight position is moved as long as the line-of-sight position is moved within a predetermined range. Also, by selecting, as the diffusion screen 362, a diffusion screen having characteristics where light distribution angles $\psi 1$ and $\psi 2$ fall within a range from the first reflection position 401 to the second reflection position 402 of the projection mirror 400 or a range from the third reflection position 403 to the fourth reflection position 404, the image display light can be utilized highly efficiently. If the light distribution angles are narrower than these reflection position ranges, the range of a viewpoint where a bright virtual image 450 is able to be presented becomes narrow. On the other hand, if the light distribution angles are wider than these reflection position ranges, the proportion of image display light that is not reflected by the projection mirror 400 increases, and the virtual image 450 presented to the user thus becomes dark. As described, by properly controlling the light distribution angles ψ1 and ψ2, a bright virtual image 450 can be presented to the user with high efficiency, and the visibility of the virtual image 450 can be increased.

The intermediate image formation unit 360 has a concave lens 364 that controls the respective directions of the principal rays A0 and B0 that have passed through the intermediate image formation unit 360. By providing the concave lens 364 as the intermediate image formation unit 360, the virtual image 450 that is presented to the user can be further enlarged even when a distance D between the intermediate image formation unit 360 and the projection mirror 400 has to be shortened. Therefore, by providing the concave lens 364, a larger virtual image 450 can be presented while the size of the optical unit 100 is reduced, and the visibility of the virtual image 450 can be increased.

In the intermediate image formation unit 360, the concave lens 364 is provided eccentrically in the vertical direction. Thereby, instead of presenting the virtual image 450 right in front in the user's line-of-sight direction, the virtual image 450 can be presented at a position that is shifted slightly in the vertical direction. This is because an angular difference can be provided between light for presenting an upper end portion 451 of the virtual image 450 and light for presenting a lower end portion 452 of the virtual image 450. By shifting the virtual image 450 in the vertical direction, the virtual image 450 can be presented at a position that can be easily viewed by the user, and the visibility of the virtual image 450 can be increased. By using a concave lens that is eccentrically provided in the vertical direction, the optical unit 100 can be further downsized.

Further, in the intermediate image formation unit 360, two light diffusion plates 380a and 380b, which are microlens arrays, are used in combination as the diffusion screen 362. Thereby, even when light is made incident on the diffusion screen 362 at an angle in order to present image display light with an angular difference to the user, the light distribution of light that has passed through the diffusion screen 362 can be arranged. Further, while suppressing unevenness in the luminance of an image that is presented as the virtual image 450, the light distribution angle of the transmitted light can be increased so that the range of the line-of-sight position in which the entire virtual image 450 can be visually recognized is enlarged. As a result, the visibility of the virtual image 450 can be increased.

The diffusion screen 362 is formed by the combination of the first lens array surface 382a formed of the first microlens 383a having a circular shape and the second lens array surface 382b formed of the second microlens 383b having an elliptical shape. By combining the two light diffusion plates 380a and 380b that have different microlens shapes, unevenness in the luminance caused by interference effects from diffracted light can be suppressed. By shaping the second microlens 383b into an elliptical shape that has a short axis in the x direction and a long axis in the y direction, a light distribution angle in the x direction can become larger than that in the y direction. Thereby, a visually viewable range can be widened in the x direction (lateral direction), and the visibility of the virtual image 450 can be increased.

The diffusion screen 362 is formed such that the distance W between the first lens array surface 382a and the second lens array surface 382b has a predetermined value. By setting this distance W to be in a certain range, the virtual image 450 with little luminous unevenness can be presented while suppressing a decrease in the resolution caused by the generation of a double image or moire. Thereby, the visibility of the virtual image 450 can be increased.

Figure 14A:
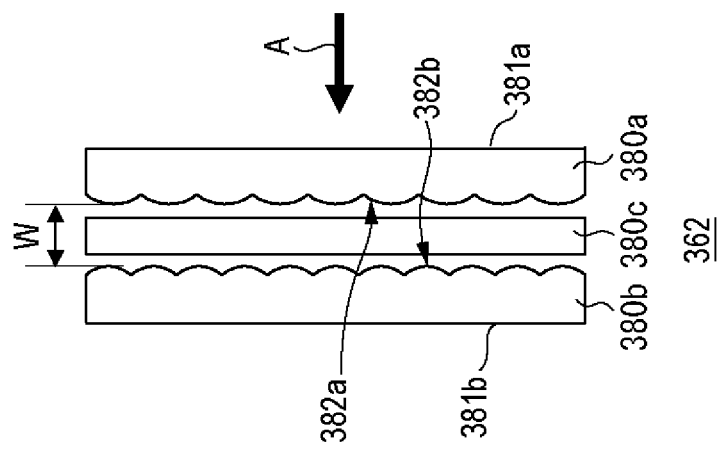
FIGS. 14A-14C are side views schematically illustrating the configuration of a diffusion screen according to an exemplary variation.
Figure 14B:
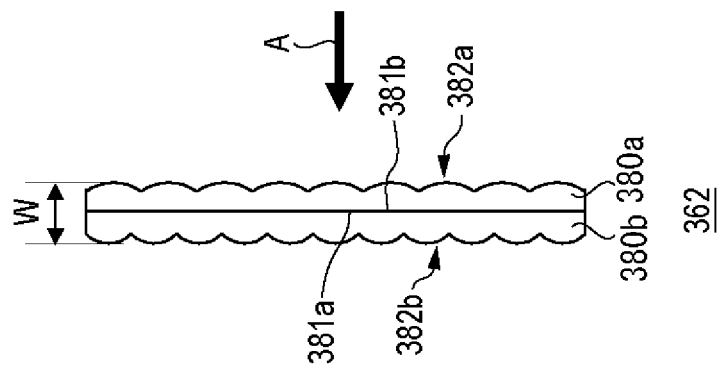
Figure 14C:
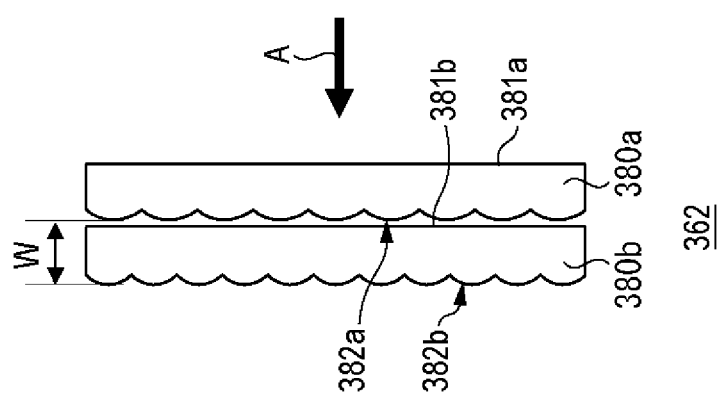

Then, with reference to FIG. 14, a diffusion screen 362 according to an exemplary variation will be shown. FIGS. 14A-14C are side views schematically illustrating the configuration of the diffusion screen 362 according to the exemplary variation.

FIG. 14A illustrates a diffusion screen 362 according to a first exemplary variation. In the first exemplary variation, two light diffusion plates 380a and 380b are layered such that a first lens array surface 382a and a second flat surface 381b face each other. As a result, light entering the diffusion screen 362 passes through a first flat surface 381a, the first lens array surface 382a, the second flat surface 381b, and a second lens array surface 382b in said order. Even in such a configuration, the same effects as those obtained in the above-described embodiment can be obtained by setting a distance W between the first lens array surface 382a and the second lens array surface 382b to be in a certain range.

FIG. 14B illustrates a diffusion screen 362 according to a second exemplary variation. In the second exemplary variation, two light diffusion plates 380a and 380b are layered such that a first flat surface 381a and a second flat surface 381b come into contact with each other. As a result, light entering the diffusion screen 362 passes through a first lens array surface 382a, the first flat surface 381a, the second flat surface 381b, and a second lens array surface 382b in said order. In order for a distance W between the first lens array surface 382a and the second lens array surface 382b to be in a certain range, the thickness of the first light diffusion plate 380a and the thickness of the second light diffusion plate 380b are adjusted such that the total value thereof is equal to the value of the distance W at this time. Also in the second exemplary variation, the same effects as those obtained in the above-described embodiment can be obtained.

In the second exemplary variation, the two light diffusion plates 380a and 380b do not need to be formed separately. A single light diffusion plate having a lens array surface formed on each side may be used instead. In this case, the first lens array surface 382a is formed on one side, and the second lens array surface 382b is formed on the other side. The thickness of this light diffusion plate is adjusted such that the thickness is equal to the distance W. Also in such a configuration, the same effects as those obtained in the above-described embodiment can be obtained.

FIG. 14C illustrates a diffusion screen 362 according to a third exemplary variation. In the third exemplary variation, a first lens array surface 382a and a second lens array surface 382b are arranged such that the first lens array surface 382a and the second lens array surface 382b face each other, and a light transmitting plate 380c is provided therebetween. The light transmitting plate 380c is provided with a flat surface on each side thereof and is formed of a transparent resin material such as polycarbonate. The light transmitting plate 380c has a role of keeping a distance W between the first lens array surface 382a and the second lens array surface 382b to be in a certain range, and the thickness of the light transmitting plate 380c is adjusted to be equal to the distance W. Also in such a configuration, the same effects as those obtained in the above-described embodiment can be obtained.

Second Embodiment

Figure 16:
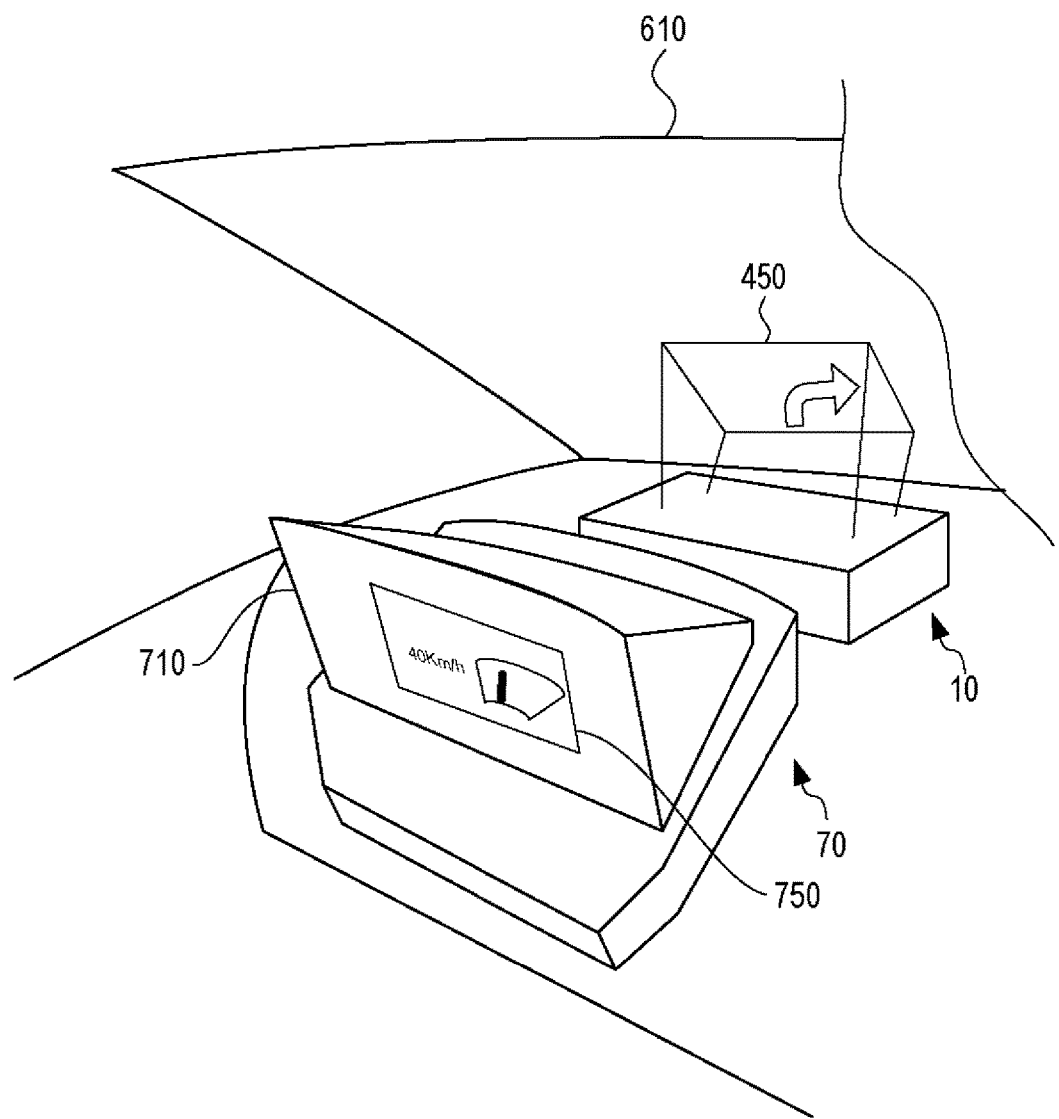
FIG. 16 is a perspective view schematically illustrating a form of installation of the head-up display and the instrument panel.
Figure 17:
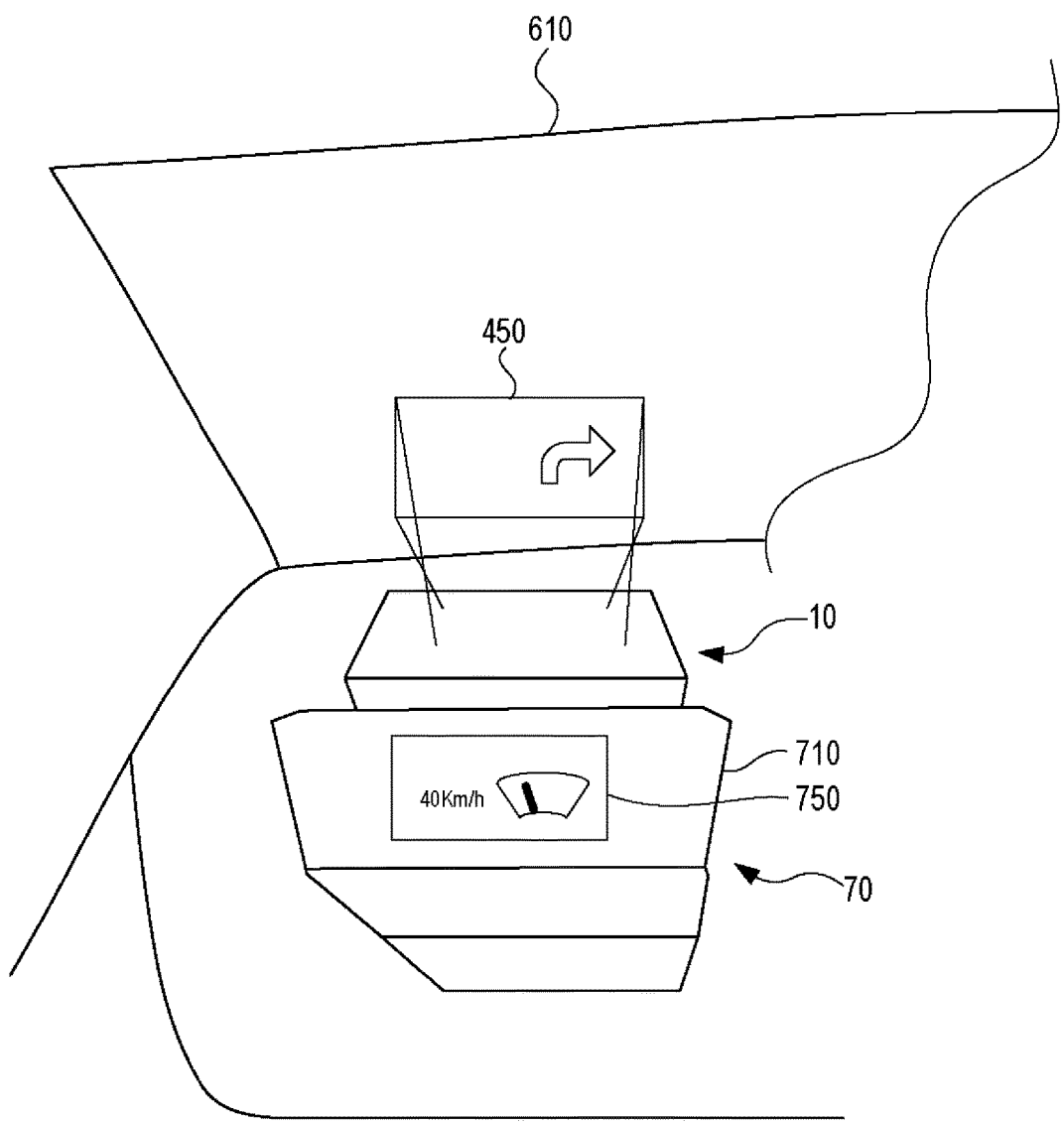
FIG. 17 is a front view schematically illustrating the form of installation of the head-up display and the instrument panel.

A diffusion screen 362, which is a transmission-type screen, in the first embodiment described above is applicable in various devices that present virtual images as well as for the purpose of being used in a head-up display 10. As another specific embodiment, the diffusion screen 362 can be used in an instrument panel used in motor vehicles, and the like. With reference to FIG. 15 through FIG. 17, an explanation will be given in the following regarding the configuration of an image display device that displays various types of information on an instrument panel by using virtual images.

FIG. 15 is a diagram schematically illustrating a form of installation of a head-up display 10 and an instrument panel 70 according to another embodiment of the present invention. In the present embodiment, in addition to a virtual image 450 that is presented by the head-up display 10, another virtual image 750 is presented by the instrument panel 70. The two virtual images 450 and 750 can be viewed as if the virtual images 450 and 750 were located further away from a windshield 610 or a smoke plate 710, which is a virtual image presenting surface.

The user, who is the driver, sees both the virtual image 450 presented via the windshield 610 and the virtual image 750 presented via the smoke plate 710 by moving the line-of-sight direction. In the present embodiment, by displaying the two virtual images 450 and 750 such that the virtual images 450 and 750 can be viewed at the same or almost the same distance when viewed from a user's viewpoint E, respective focal positions of the two virtual images 450 and 750 viewed from the user's viewpoint E are set to be almost the same. Thereby, the amount of focus shifting is reduced when both the virtual images 450 and 750 are viewed by moving the line-of-sight direction during driving or the like, and the user's burden associated with the shifting of the line of sight is reduced.

The configuration of the head-up display 10 is the same as the configuration according to the above-described first embodiment. The configuration of the instrument panel 70 is also the same as that of the head-up display 10 except that the instrument panel 70 presents a virtual image 750 by means of image display light that has passed through the smoke plate 710 instead of presenting a virtual image 450 by the reflection of image display light by the windshield 610. An explanation will be given in the following mainly regarding the configuration of the instrument panel 70.

The instrument panel 70 is provided with an image projection unit 720, an intermediate mirror 735, an intermediate image formation unit 736, a concave mirror 740, and a smoke plate 710. The image projection unit 720, the intermediate mirror 735, the intermediate image formation unit 736, and the concave mirror 740 of the instrument panel 70 are the same as the image projection unit 210, the intermediate mirror 350, the intermediate image formation unit 360, and the projection mirror 400 of the head-up display 10 described above, respectively.

The instrument panel 70 allows image display light produced by the image projection unit 720 to form a real image in the intermediate image formation unit 736 and projects the image display light associated with the real image formed in the intermediate image formation unit 736 onto the smoke plate 710 after enlarging and reflecting the image display light by the concave mirror 740. Thereby, the user visually recognizes, via the smoke plate 710, an image that is reflected and enlarged by the concave mirror 740. In particular, by using the concave mirror 740 that has a shape that is capable of enlarging the real image formed in the intermediate image formation unit 736 to a size of ten times or more, the instrument panel 70 can be downsized.

The user directly and visually recognizes the image display light reflected by the concave mirror 740 via the smoke plate 710. However, in reality, the user sees a virtual image 750 of around 10 inches to 12 inches around 1 m to 2 m ahead of a user's viewpoint E. The user is able to visually recognize the image display light presented by the head-up display 10 via the windshield 610 and sees a virtual image 450 of around 12 inches around 2 m ahead of the user's viewpoint E.

The smoke plate 710 is a flat-plate like member having a low light transmittance. The smoke plate 710 is formed, for example, by laminating a smoke film on a smoke resin plate. Such a configuration allows the transmittance of the smoke plate 710 to be lowered and the reflectance at an interface of the smoke plate 710 to be lowered. Also, the smoke resin plate can be protected by the film. The smoke plate 710 may be a plate-like member that forms a curved surface instead of having a flat-plate like shape.

The value of the transmittance of the smoke plate 710 is desirably smaller than the value of the reflectance at the interface of the smoke plate 710 and is preferably eight percent or less. By setting the transmittance to eight percent or less, entry of sunlight or the like to the concave mirror 740 from the back of the user or from above the user and reflection of light on the user or other constituting members can be prevented. Also, by lowering the transmittance of the smoke plate 710, a configuration can be achieved where the inside of the instrument panel 70 is hard to see. Thereby, the visibility of the virtual image 750 can be increased, and the designability of the instrument panel 70 can be also increased.

The smoke plate 710 may be provided with a sensor for a touch panel on a surface thereof. By allowing the smoke plate 710 to function as a touch panel, the smoke plate 710 can also function as a user interface that makes settings for the instrument panel 70. With this, an input button or the like for the instrument panel 70 no longer need to be provided at another position on a dashboard, and the top of the dashboard can thus be cleared.

Just like the head-up display 10, the instrument panel 70 includes a control device. As for the control device of the instrument panel 70, a control device 50 of the head-up display 10 may be used in a shared manner or a control device that is different from that of the head-up display 10 may be provided.

The instrument panel 70 displays contents indicated by meters provided in instrument panels of commonly-used vehicles such as speed meters, tachometers, fuel meters, shift positions, etc., by using an image signal from the control device. Also, the instrument panel 70 may display an image of the rear side of the vehicle that is imaged by a camera that images the rear side of the vehicle.

Regarding contents displayed on the instrument panel 70, the size of an image and a display mode that are assigned to each display content may be changed depending on various conditions such as a driving status, input information from the user, etc. For example, a display mode according to the user's preference may be employed, the size of a speed meter may be increased according to the travelling speed of the vehicle, and an image of the rear side of the vehicle may be displayed largely without displaying the speed meter, etc., during backward travelling.

FIG. 16 is a perspective view schematically illustrating a form of installation of the head-up display 10 and the instrument panel 70. FIG. 17 is a front view schematically illustrating a form of installation of the head-up display 10 and the instrument panel 70. As illustrated in the figures, a smoke plate 710 is installed at the front surface of the instrument panel 70 and is provided at a position at which an instrument panel is provided in a commonly-used vehicle. As a result, the smoke plate 710 is arranged such that the smoke plate 710 is positioned in front of the user seating on the driver's seat, and the user, who is the driver, visually recognizes the smoke plate 710 over the wheel.

Further, a virtual image 450 that is presented by the head-up display 10 is displayed at a position located behind the instrument panel 70 when viewed from the user's viewpoint E. As a result, the virtual image 450 presented by the head-up display 10 and a virtual image 750 presented by the instrument panel 70 are arranged almost coaxially with the user's viewpoint E. By employing such arrangement, the user's viewpoint movement can be further reduced, and a view outside the vehicle, the virtual image 450 presented by the head-up display 10, and the virtual image 750 presented by the instrument panel 70 can be viewed at the same time.

With the above configuration, the virtual image 450 presented by the head-up display 10 and the virtual image 750 presented by the instrument panel 70 are arranged almost coaxially with the user's viewpoint E and are viewed at the same distance or almost at the same distance from the user's viewpoint E. Therefore, when moving the line of sight from a state where a landscape outside a vehicle is viewed along with the virtual image 450 presented by the head-up display 10 to a state where the virtual image 750 presented by the instrument panel 70 is viewed, both a user's viewpoint moving angle and the amount of focus shifting can be decreased. Thereby, the user's burden associated with the shifting of the line of sight can be reduced while presenting more information to the user.

In the instrument panel 70 according to the exemplary variation, a distance from the user's viewpoint E to the virtual image 750 and the size of the virtual image 750 that is visually recognized may be changed according to various conditions such as a driving situation and input information from the user. An instrument panel 70 according to such an exemplary variation is further provided with a driving unit that adjusts the position of an intermediate image formation unit 736 and the position of a concave mirror 740 and adjusts the distance and size of a virtual image 750 by controlling this driving unit.

For example, a control device of the instrument panel 70 acquires vehicle speed information, and when the traveling speed of the vehicle is a predetermined speed or greater such as 60 km/h or higher, a distance to the virtual image 750 of the instrument panel 70 is set to be the same or almost the same as a distance to the virtual image 450 of the head-up display 10. In general, when the travelling speed of the vehicle is high, driving is performed while focusing on a position that is relatively far. Thus, the burden associated with the shifting of the line of sight can be reduced by locating the focal position of the virtual image 750 presented by the instrument panel 70 to be far away.

On the other hand, when the traveling speed of the vehicle is a predetermined speed or less, the distance to the virtual image 750 of the instrument panel 70 is set to be shorter by around several tens of cm to 1 m than the distance to the virtual image 450 of the head-up display 10. In general, when the travelling speed of the vehicle is low, driving is performed while focusing on a position that is relatively close. Thus, the burden associated with the shifting of the line of sight can be reduced by shortening the distance to the focal position of the virtual image 750 presented by the instrument panel 70. In addition, the distance to the virtual image 750 of the instrument panel 70 may be set to be closer also during backward travelling. By such control, more information can be presented to the user while reducing the user's burden associated with the shifting of the line of sight. Due to a decrease in the burden associated with the shifting of the line of sight, the user is able to check more information in less time.

The present invention has been described by referring to each of the above-described embodiments. However, the present invention is not limited to the above-described embodiments only, and those resulting from any combination of them as appropriate or substitution are also within the scope of the present invention.

In the above-described embodiment, a case is shown where a concave lens 364 is arranged in front of a diffusion screen 362 as an intermediate image formation unit 360, i.e., a case is shown where image display light that pas passed through the concave lens 364 enters the diffusion screen 362. As another exemplary variation, the diffusion screen 362 and the concave lens 364 may be arranged reversely. In this case, optical elements are arrayed in the order of an intermediate mirror 350, a diffusion screen 362, a concave lens 364, and a projection mirror 400 between the intermediate mirror 350 and the projection mirror 400. Even when the direction of the intermediate image formation unit 360 is reversed, a virtual image 450 with high visibility can be presented by controlling the light distribution angle of image display light by the diffusion screen 362 and by controlling the direction of a principal ray by the concave lens 364.

In the above-described embodiment, the direction of a principal ray of image display light is controlled by using the concave lens 364 as the intermediate image formation unit 360. In an exemplary variation, the intermediate image formation unit 360 may be provided with only the diffusion screen 362 without providing the concave lens 364. In this exemplary variation, the direction of a principal ray of image display light is adjusted by a projection lens group 242 provided in an image projection unit 210.

In the above-described embodiment, a case is shown where a second lens array surface 382b is formed of an elliptically-shaped second microlens 383b having a short axis in an x direction and a long axis in a y direction. In an exemplary variation, a second lens array surface 382b may be formed such that the direction of the long axis of a second microlens 383b and the direction of the short axis of the second microlens 383b are in different directions. For example, in the case where a light distribution angle in the vertical direction (y direction) is desired to be increased, the second lens array surface 382b may be formed such that the short axis is in the y direction. Also in this case, the same effects as those obtained in the above-described embodiment can be obtained.

In the above-described embodiment, a case is shown where light entering a diffusion screen 362 passes through a first lens array surface 382a formed of a circular-shaped first microlens 383a and a second lens array surface 382b formed of an elliptically-shaped second microlens 383b in said order. In an exemplary variation, the arrangement of a first lens array surface 382a and a second lens array surface 382b may be reversed such that incident light passes through the second lens array surface 382b and the first lens array surface 382a in said order.

In the above-described embodiment, a case is shown where a first lens array surface 382a is formed of a circular-shaped first microlens 383a. In an exemplary variation, a first microlens 383a having an elliptical shape may be used. In this case, the shape of the first microlens 383a and the shape of a second microlens 383b are desirably different, and the value of first ellipticity $e_a$ and the value of second ellipticity $e_b$ are desirably set to be different. In two light diffusion plates, the generation of a diffraction peak caused by interference that is caused by diffracted light can be suppressed by setting the value of the first ellipticity $e_a$ and the value of the second ellipticity $e_b$ of respective microlenses to be different values.

In the above-described embodiment, a case is shown where the shape of the respective contours 384a and 384b of a first microlens 383a and a second microlens 383b is a hexagonal shape. In an exemplary variation, the shape of the contour of a microlens may be set to be a square shape, and a plurality of microlenses may be arranged in a lattice shape or in a hexagonal lattice shape. Alternatively, the shape of the contour of a microlens may be set to be a circular or elliptical shape, and circular or elliptical microlenses may be arrayed on a flat surface.

In the above-described embodiment, an example is explained where a head-up display 10 used for vehicles or an instrument panel 70 is used as an image display device that presents a virtual image. As another exemplary variation, an image display device according to the present invention may be applied to a virtual image electron mirror for checking the rear side of a vehicle by projecting a virtual image.

Having the same configuration as that of an instrument panel 70, a virtual image electron mirror presents an image from a camera that images the rear side of a vehicle to the user in real time. A virtual image electron mirror can be used as a device that assists a commonly-used side mirror or rearview mirror or a replaceable device. For example, when a virtual image electron mirror is used in replacement of a side mirror, the virtual image electron mirror is provided at a position on each side of an instrument panel that is formed of commonly-used meters or the above-described instrument panel 70 capable of presenting a virtual image 750 so as to present an image of the rear side of the vehicle.

The distance from a user's viewpoint E to a virtual image presented by the virtual image electron mirror is desirably the same or almost the same as the distance of the virtual image 750 presented by the instrument panel 70 at this time. When there are a plurality of devices that present a variety of information to the user as virtual images, the user's burden associated with the shifting of the line of sight can be reduced by setting the virtual images to be able to be viewed further away from virtual image presenting surfaces of the respective devices.

Also in a virtual image electron mirror, the distance or size of a virtual image may be changeable in response to the speed or other conditions of the vehicle in the same way as in an instrument panel 70. By setting the distance of the virtual image to be the same or almost the same as the distance of a virtual image presented by an instrument panel 70, the user's burden associated with the shifting of the line of sight can be reduced. With this, the amount of time used for safety checking or information checking that is necessary for operating the vehicle can be reduced, and a user-friendly system can be realized.

What is claimed is:

1. A transmission-type screen comprising:
   a first lens array surface on which a plurality of first microlenses are arrayed; and
   a second lens array surface that is provided at a distance in a direction perpendicular to the first lens array surface and on which a plurality of second microlenses whose shape is different from the shape of the first microlenses are arrayed;
   wherein the transmission-type screen has a shape where the width thereof in an x-axis direction is longer than the width thereof in a y-axis direction in an orthogonal coordinate system where a direction perpendicular to the first lens array surface is set to be a z-axis direction,
   wherein a level line near a vertex is circular in the first microlenses, and
   wherein a level line near a vertex is elliptical having a short axis in the x-axis direction and a long axis in the y-axis direction in the second microlenses.

2. The transmission-type screen according to claim 1, comprising:
   a first light diffusion plate that has the first lens array surface and a first flat surface that faces away from the first lens array surface; and
   a second light diffusion plate that has the second lens array surface and a second flat surface that faces away from the second lens array surface,
   wherein the second light diffusion plate is arranged such that the second lens array surface faces the first flat surface.

3. The transmission-type screen according to claim 1, configured such that light that enters the transmission-type screen enters the second lens array surface after entering the first lens array surface.

4. The transmission-type screen according to claim 1, wherein the distance between the first lens array surface and the second lens array surface is not less than 200 μm nor more than 400 μm.

5. An image display device comprising:
   an image projection unit that projects image display light;
   an intermediate image formation unit that forms a real image that is based on the image display light projected from the image projection unit; and
   a projection mirror that reflects, toward a virtual image presenting surface, the image display light that has passed through the intermediate image formation unit;
   wherein the intermediate image formation unit includes:
   a first lens array surface on which a plurality of first microlenses are arrayed; and
   a second lens array surface that is provided at a distance in a direction perpendicular to the first lens array surface and on which a plurality of second microlenses whose shape is different from the shape of the first microlenses are arrayed,
   wherein the transmission-type screen has a shape where the width thereof in an x-axis direction is longer than the width thereof in a y-axis direction in an orthogonal coordinate system where a direction perpendicular to the first lens array surface is set to be a z-axis direction,
   wherein a level line near a vertex is circular in the first microlenses, and
   wherein a level line near a vertex is elliptical having a short axis in the x-axis direction and a long axis in the y-axis direction in the second microlenses.

* * * * *